G. WEISS.
LABELING MACHINE.
APPLICATION FILED JAN. 10, 1914.
1,198,981.
Patented Sept. 19, 1916.
11 SHEETS—SHEET 3.
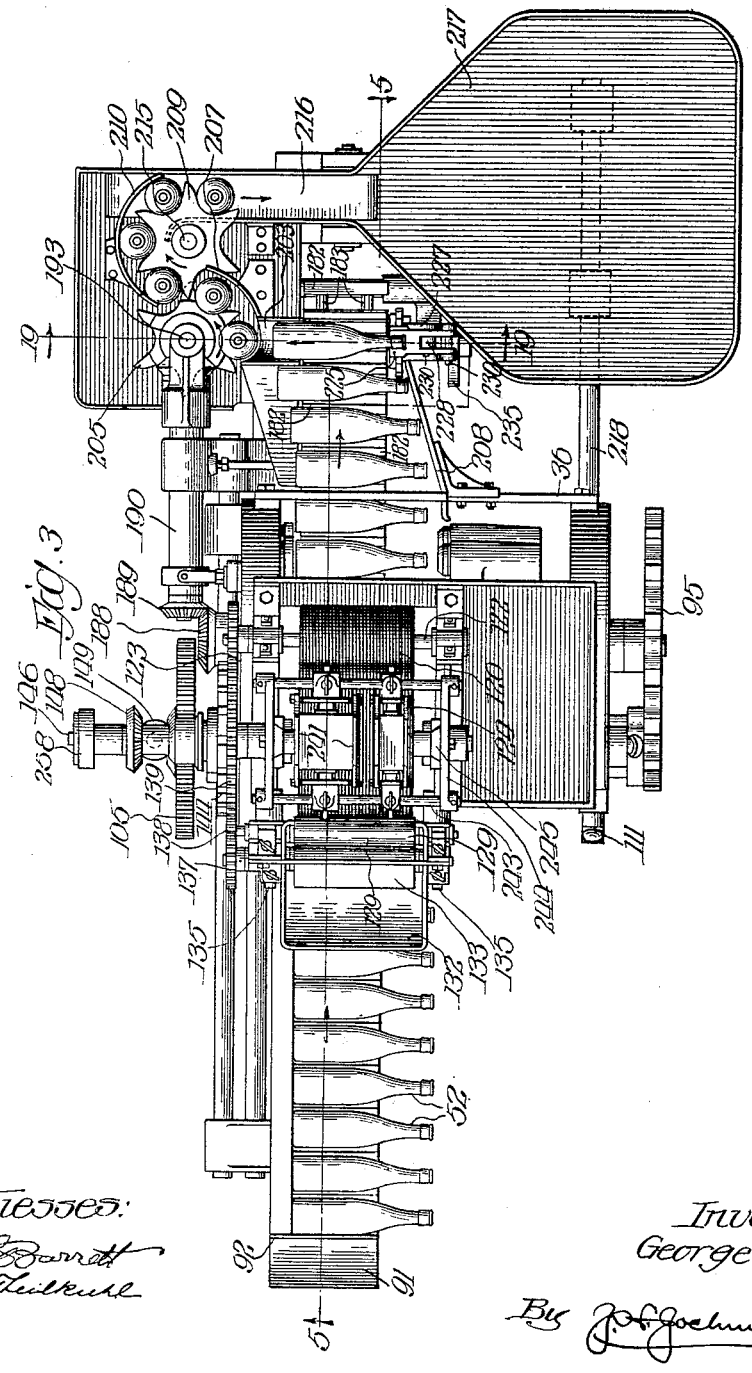
Witnesses:
Inventor:
George Weiss

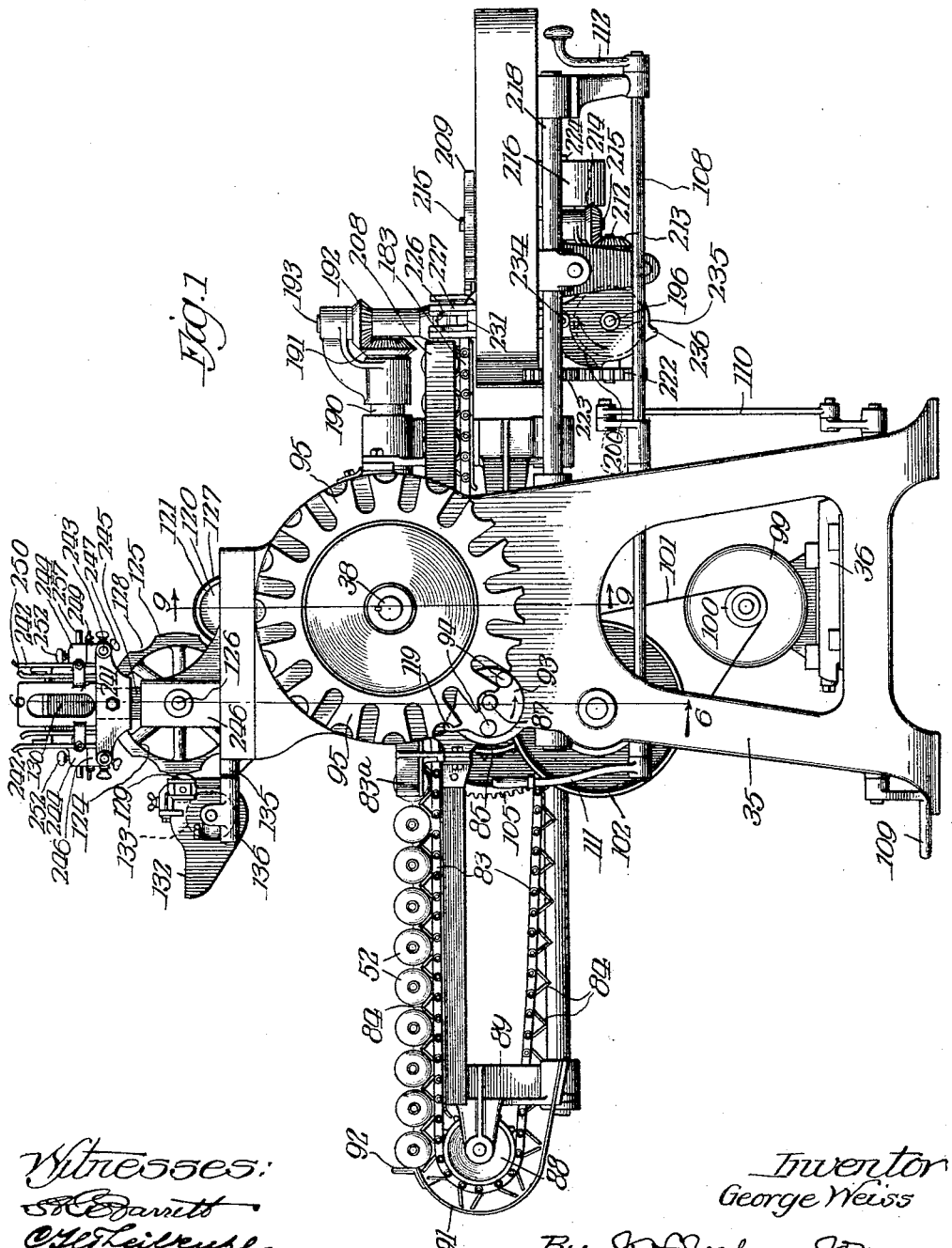

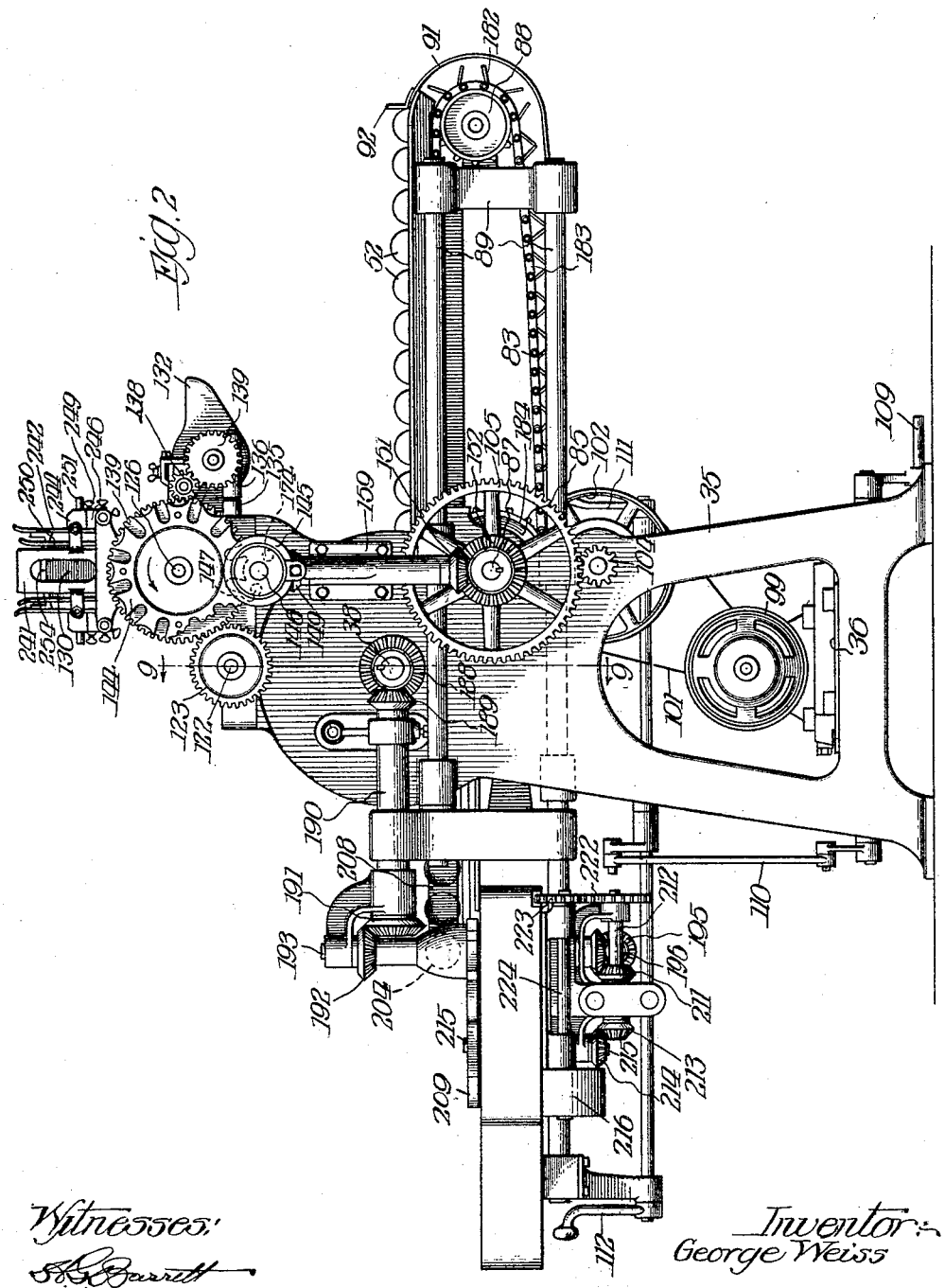

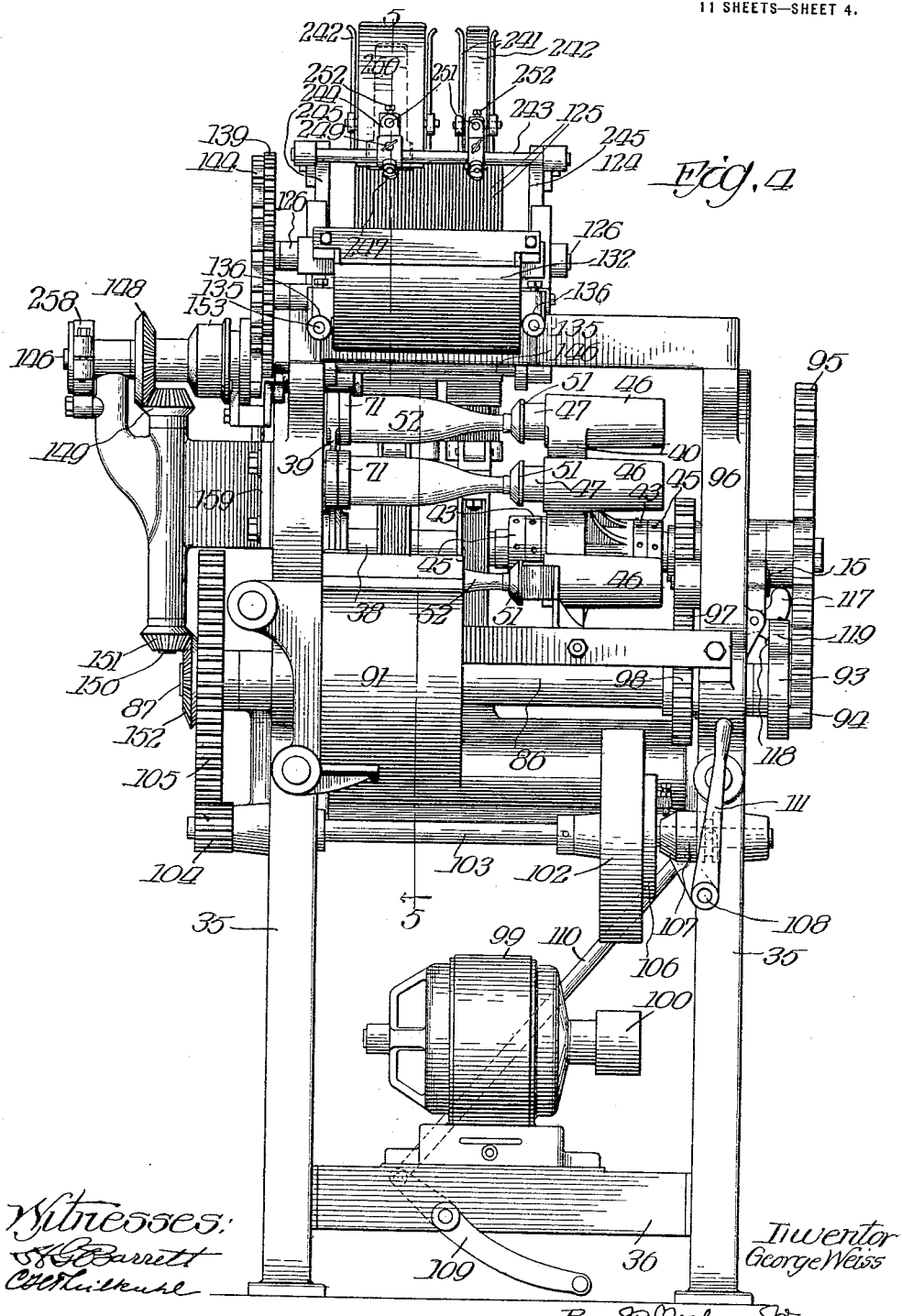

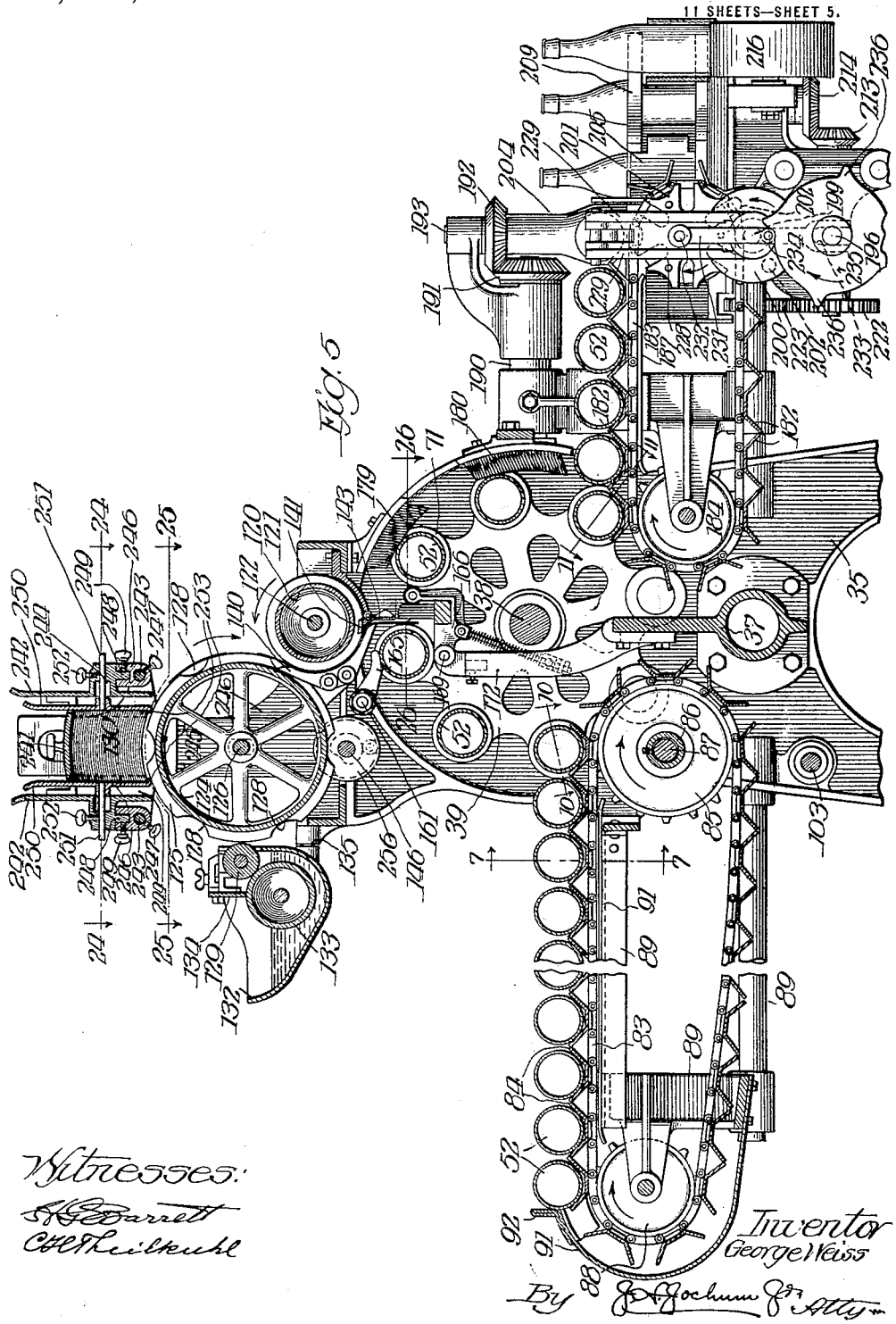

G. WEISS.
LABELING MACHINE.
APPLICATION FILED JAN. 10, 1914.
1,198,981.
Patented Sept. 19, 1916.
11 SHEETS—SHEET 6.
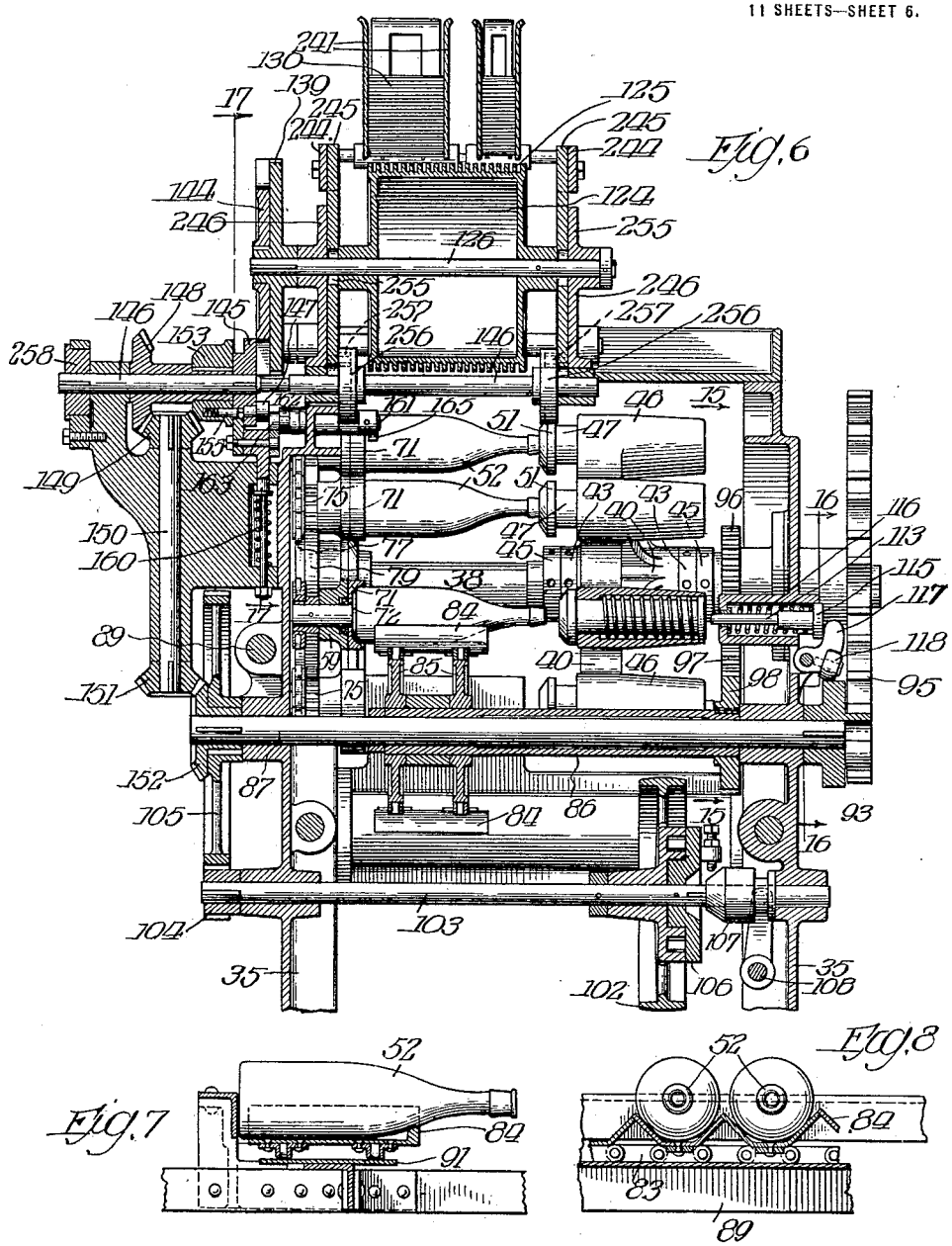
Witnesses:
Inventor:
George Weiss

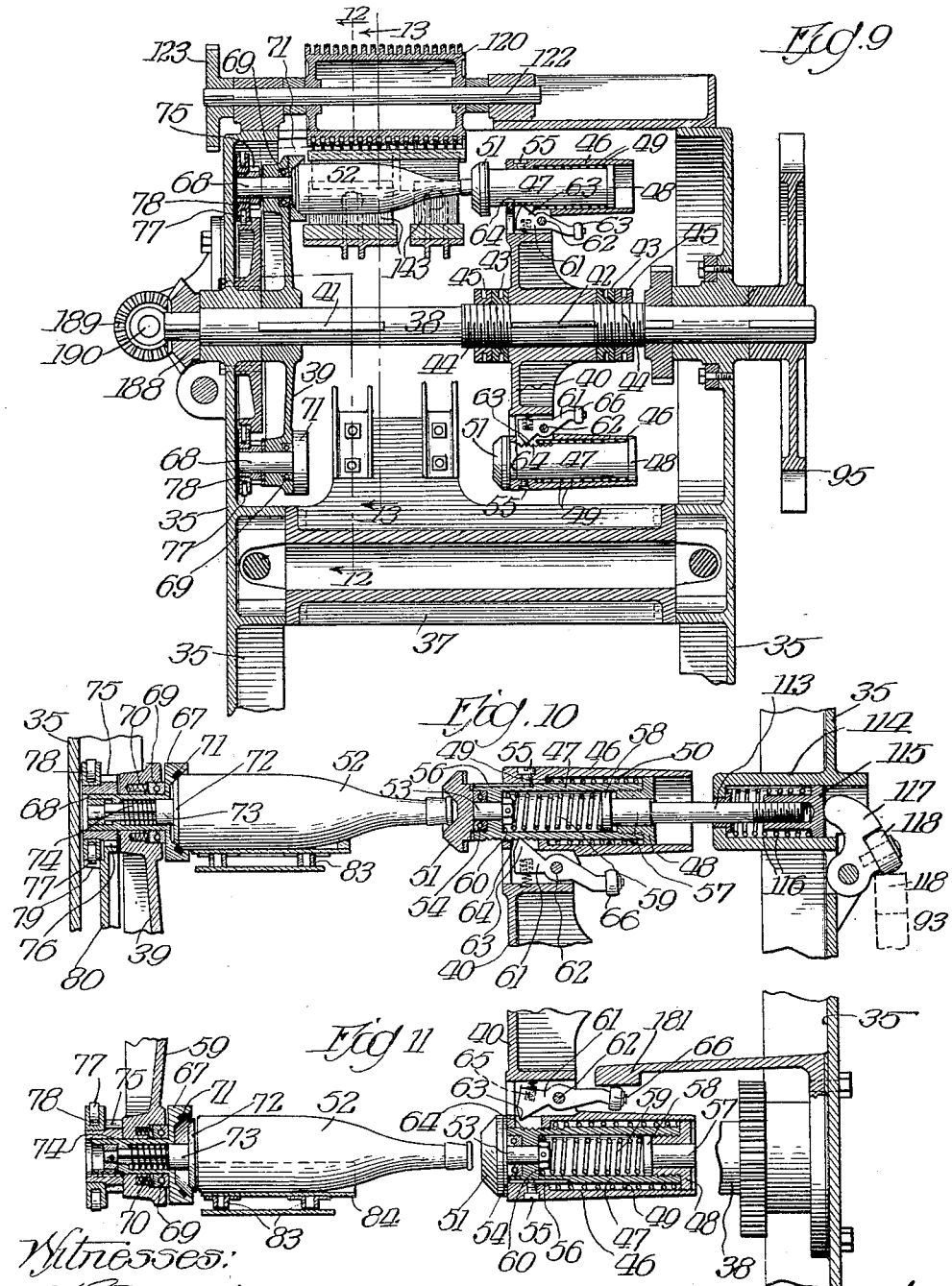

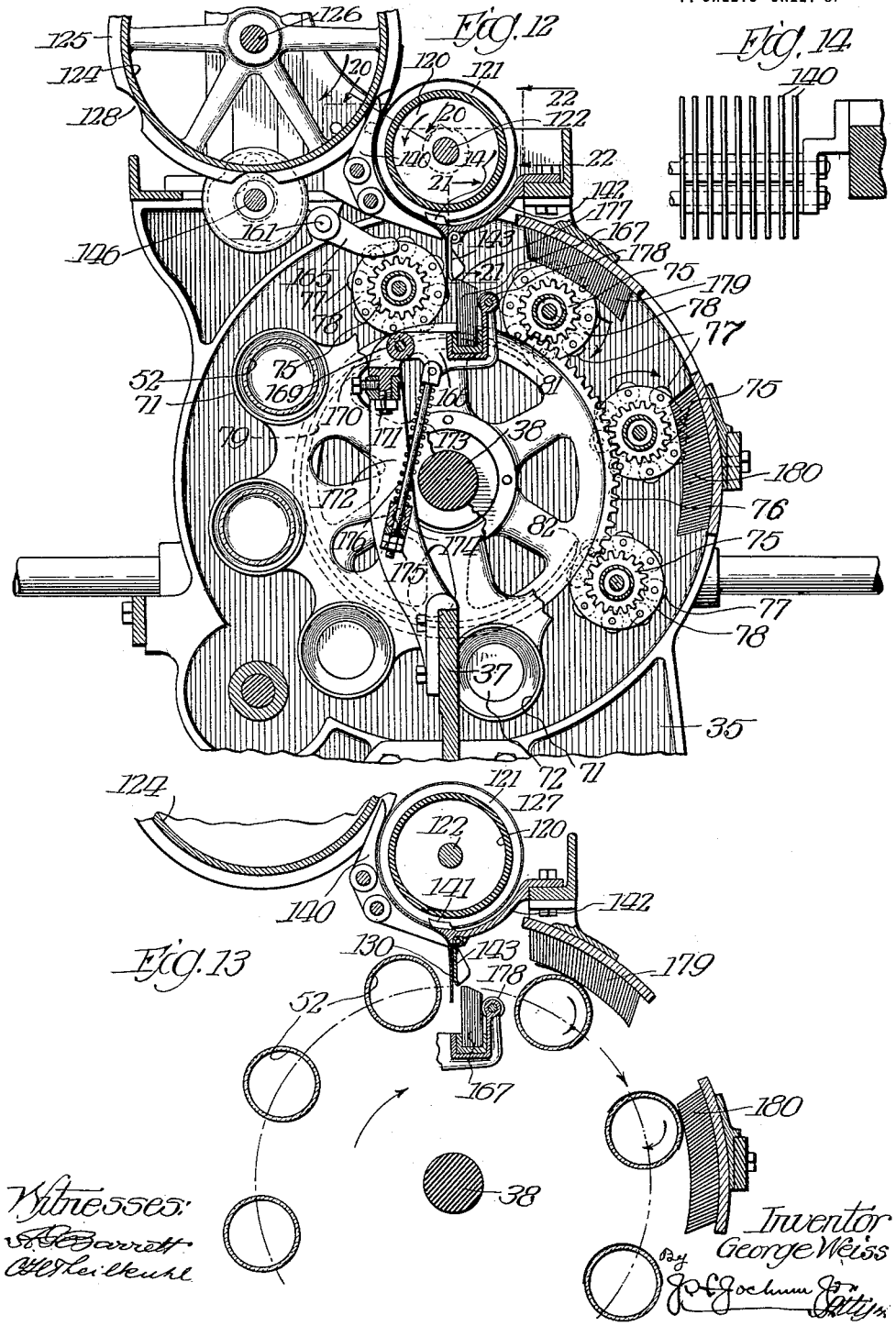

G. WEISS.
LABELING MACHINE.
APPLICATION FILED JAN. 10, 1914.
1,198,981.
Patented Sept. 19, 1916.
11 SHEETS—SHEET 9.
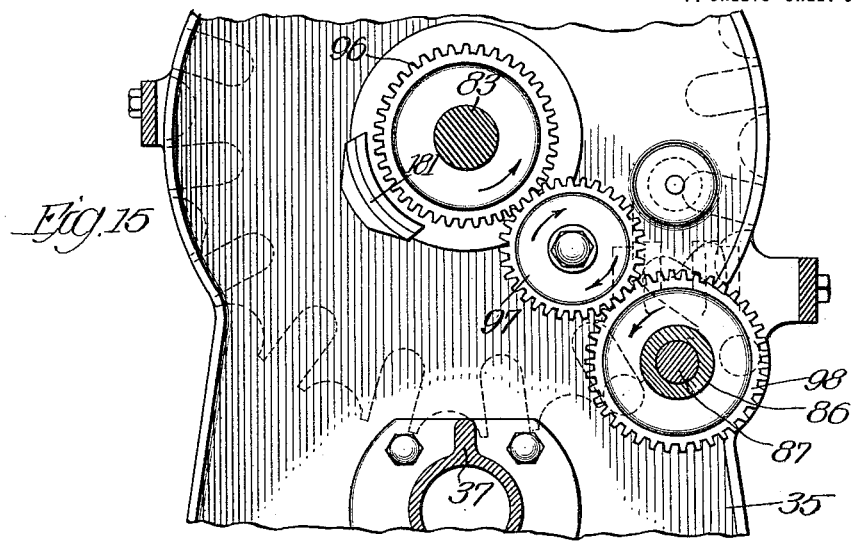
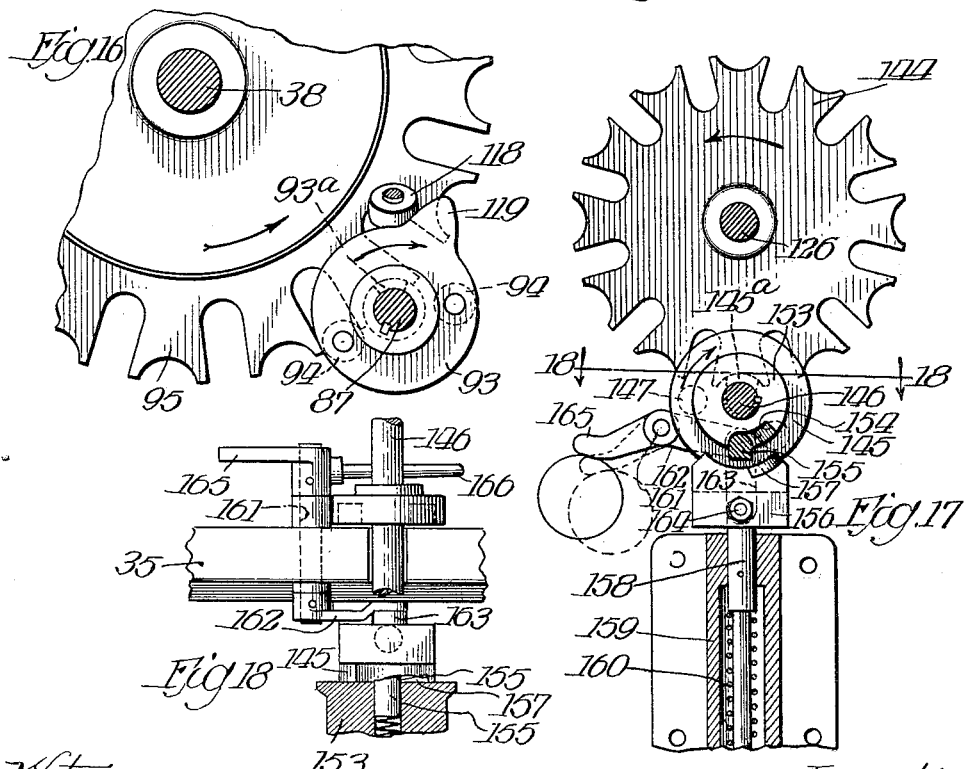
Witnesses
Inventor
George Weiss
By
Atty

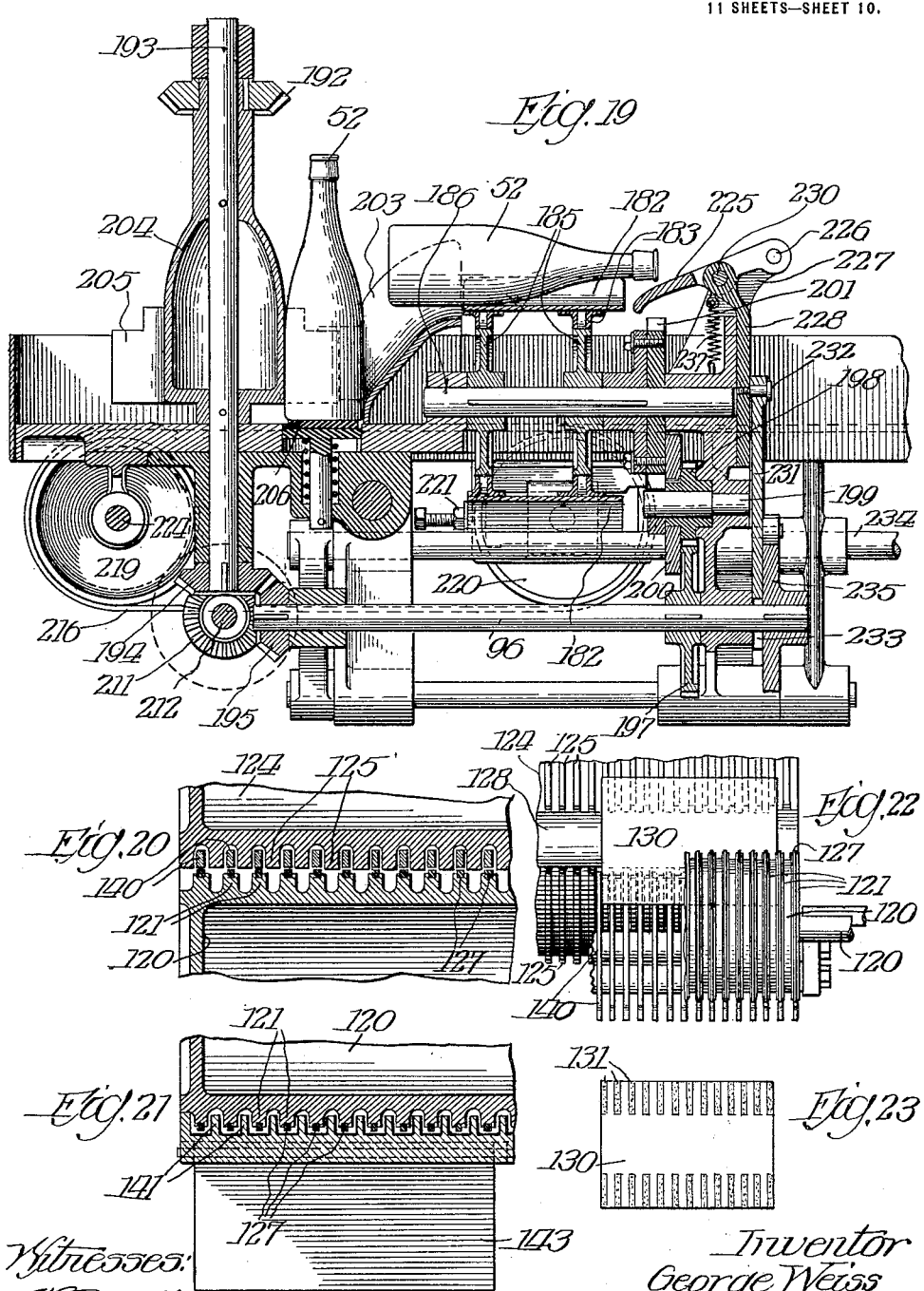

G. WEISS.
LABELING MACHINE.
APPLICATION FILED JAN. 10, 1914.
1,198,981.
Patented Sept. 19, 1916.
11 SHEETS—SHEET 11.
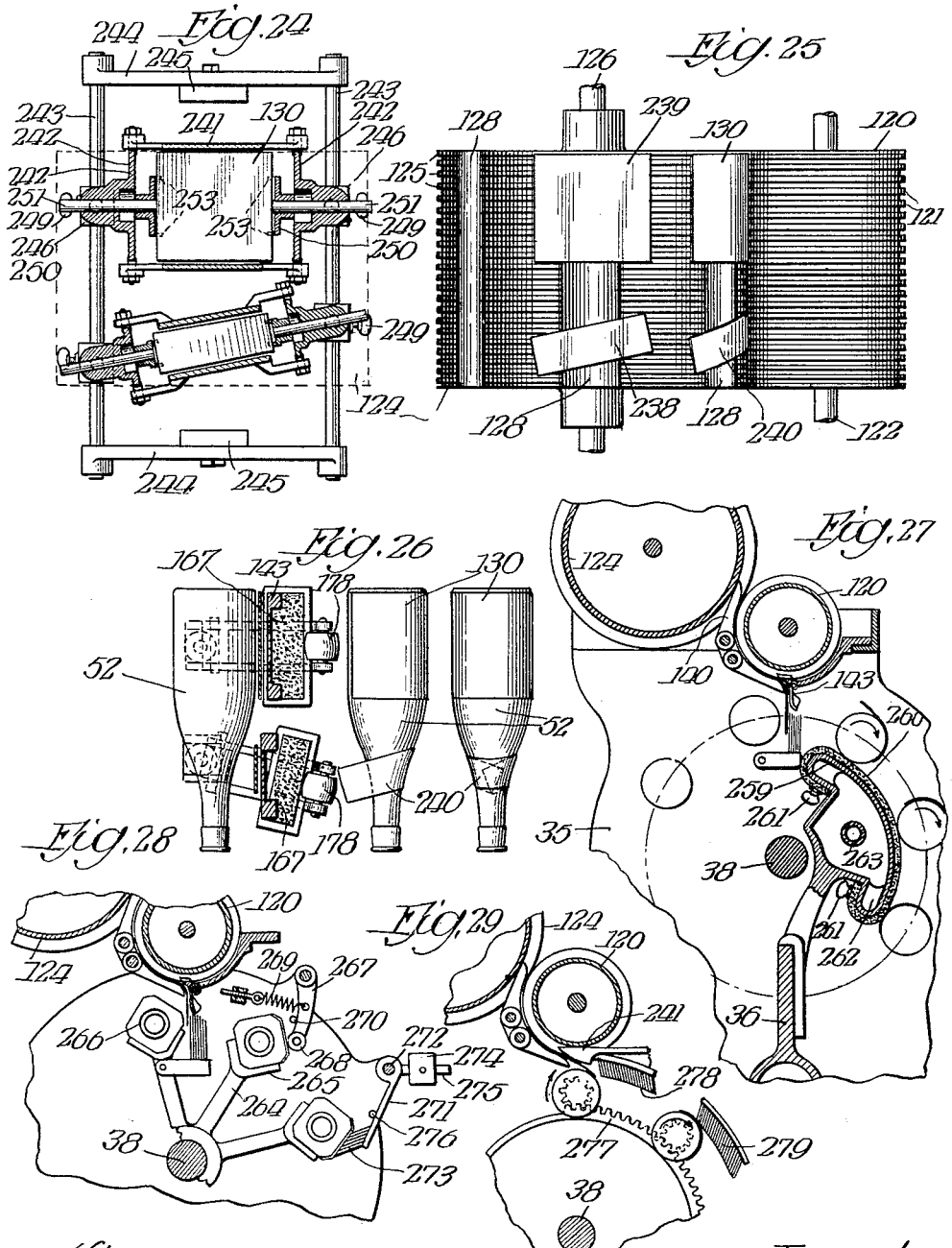
Witnesses
Inventor
George Weiss

UNITED STATES PATENT OFFICE.

GEORGE WEISS, OF CHICAGO, ILLINOIS.

LABELING-MACHINE.

1,198,981.  Specification of Letters Patent.  Patented Sept. 19, 1916.

Application filed January 10, 1914. Serial No. 811,283.

*To all whom it may concern:*

Be it known that I, GEORGE WEISS, a citizen of the United States, residing at Chicago, in the county of Cook and State of Illinois, have invented certain new and useful Improvements in Labeling-Machines, of which the following is a specification.

This invention relates to improvements in labeling machines, particularly adapted, though not necessarily limited in its use for labeling bottles, and it has for one of its objects to provide an improved machine of this character which will be automatic in its action, and of a compact and comparatively simple construction, and one in which a label may be applied to one or more portions of the bottle and smoothed out in such a manner, that the entire label will adhere to the bottle, thereby obviating unpasted or protruding edges of the label.

A further object is to provide an improved machine of this character into which the bottles may be placed and fed in the proper position to receive one or more labels, and in which after the bottle has had a label applied thereto, it will be automatically delivered from the machine in an upright position on to the receiving table or support.

A further object is to provide a machine of this character which will automatically accommodate itself to bottles of varying lengths within certain limits.

A further object is to provide an improved machine of this character in which the parts and mechanisms operate in unison, and are so timed that some of the parts will be at rest, while certain parts of the operations are being performed, to maintain the bottles in the proper positions to be acted upon during their passage through the machine, and to operate to cause the bottles to be advanced, so that they will be moved out of the way of the next advancing bottle.

A further object is to provide an improved label feed, and improved means for applying the label to the bottle.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention, and in which:

Figure 1 is a front elevation of an improved machine of this character constructed in accordance with the principles of this invention. Fig. 2 is a rear elevation of the parts shown in Fig. 1. Fig. 3 is a top plan view of the machine. Fig. 4 is an end elevation as taken from the left hand end of Fig. 1. Fig. 5 is a sectional view on lines 5—5, Figs. 3 and 4. Fig. 6 is a sectional view taken on line 6—6, Fig. 1. Fig. 7 is a detail sectional view taken on line 7—7, Fig. 5. Fig. 8 is a right hand end elevation of the parts shown in Fig. 7, with parts in section. Fig. 9 is a sectional view, taken on line 9—9, Figs. 1 and 2. Fig. 10 is a detail sectional view taken on line 10—10, Fig. 5. Fig. 11 is a detail sectional view taken on line 11—11, Fig. 5. Fig. 12 is an irregular section taken on line 12—12, Fig. 9. Fig. 13 is a diagrammatic sectional view taken on line 13—13, Fig. 9. Fig. 14 is a detail view in elevation of the label supporting guides and fingers. Fig. 15 is a sectional view taken on line 15—15, Fig. 6. Fig. 16 is a sectional view taken on line 16—16, Fig. 6. Fig. 17 is a sectional view taken on line 17—17, Fig. 6. Fig. 18 is a sectional view taken on line 18—18, Fig. 17. Fig. 19 is a sectional view taken on line 19—19, Fig. 3. Fig. 20 is a sectional view taken on line 20—20, Fig. 12. Fig. 21 is a sectional view taken on line 21—21, Fig. 12. Fig. 22 is a view taken on line 22—22, Fig. 12. Fig. 23 is a plan view of that portion of the label to which the paste is applied, and showing the manner of application of the paste to the label. Fig. 24 is a sectional view taken on line 24—24, Fig. 5. Fig. 25 is a view taken on line 25—25, Fig. 5. Fig. 26 is a diagrammatic view taken on line 26—26, Fig. 5. Fig. 27 is a diagrammatic view, partly in elevation and partly in section of a modification of the label applying mechanism. Fig. 28 is a view similar to Fig. 27 of another modification. Fig. 29 is a view similar to Fig. 27 of still another modification.

Referring more particularly to the drawings and in the preferred form of the invention shown in the drawings, the main supporting structure preferably embodies two uprights 35 of any suitable size and configuration, and are laterally spaced from each other so that portions of the mechanism may operate therebetween, and these uprights are connected by suitable cross bars or members 36, 37. Journaled in these uprights 35, and in the upper portion thereof, is a shaft 38 which extends across the space between the uprights and is rotatably mounted in suitable bearings, the extremities of the shaft preferably projecting beyond the respective uprights 35 for a purpose to be set forth. This shaft 38 constitutes the support for a rotatable bottle carrier, the latter preferably comprising spaced members 39, 40, see particularly Figs. 9, 10 and 11. The member 39 is connected with the shaft 38 for rotation therewith in any suitable manner such as by means of a key 41, and the member 40 is also connected with the shaft 38 for rotation therewith preferably by means of a key 42, and is adjustable longitudinal of the shaft toward and away from the member 38, to vary the space between the members, to accommodate bottles of varying sizes. This member 40 may be secured for adjustment in any suitable manner, preferably between nuts or collars 43 which engage threaded portions 44 on the shaft 38 and jam nuts 45 are provided for securing the nuts 43 against accidental displacement.

The member 40 is provided with a plurality of laterally extending tubular portions 46 in each of which is arranged a plunger 47 having a head 48, preferably detachably secured thereto, and of a size to project beyond the periphery of the plunger 47 to form a shoulder. The head is of a size to extend across the tubular portion 46 and to move therein, and the plunger is of a size somewhat smaller than the diameter of the tubular portion to form a shoulder 49, (see Fig. 10), and between which shoulder 49 and the head 48 an elastic member 50 in the form of a coil spring is mounted, and this elastic member surrounds the plunger and tends normally to exert its stress upon the head 48 to retract or withdraw the plunger so that the cup shaped member 51 which is connected with the free extremity of the plunger, and projects between the members 39, 40, and into which cup shaped member the mouth of the bottle 52 projects, will also be withdrawn so that a bottle may be placed in the carrier in a manner to be hereinafter set forth. The cup shaped member 51 is preferably provided with a stem 53 rotatably mounted in a ball bearing 54. In order to hold the plunger against accidental displacement with respect to the member 40, and at the same time permit of a longitudinal movement, a pin and groove connection 55, 56 is provided between the member 40 and the plunger.

The plunger 47 is preferably hollow and the head 48 is preferably provided with an opening therethrough, and in which opening another plunger 57 freely moves. This plunger 57 is provided with a head 58 which is arranged within the plunger 47, and an elastic member 59 preferably in the form of a coil spring, is also arranged within the plunger 47 to engage the head 58 of the plunger 57 and to rest against the bottom 60 of the tubular portion of the plunger 47, and which elastic member is also provided for the purpose of compensation for great differences of lengths of the bottles, within certain limits.

The plunger 47 is adapted to be moved in the tubular portion 46 of the member 40 and in a direction to clamp the bottle in the carrier, and against the stress of the elastic member 49, in a manner to be hereinafter set forth, and at the proper time in the operation of the machine, and in order to hold the plunger in its projected or clamping position, any suitable holding means may be provided, such for instance as a dog 61 pivotally supported intermediate its end as at 62 upon the member 40, and the nose 63 of the dog coöperates with notches 64 on the plunger 47, an elastic member 65 being provided and which acts upon the dog in such a manner as to cause the nose 63 thereof to engage the notches 64 as shown in Fig. 10. The other extremity of the dog projects beyond the member 40 and is provided with an antifriction roller 66 for a purpose to be hereinafter set forth.

Coöperating with the cup shaped member 51 and supported by the member 39, opposite thereto, is another cup shaped member 67 into which the bottom of the bottle projects. This member 67 is provided with a stem 68 rotatably mounted in ball bearings 69, the latter being carried by the member 39, and an elastic member 70 is provided which is interposed between the member 39 and the bearing 69 and tends normally to move the cup shaped member 67 in direction laterally with respect to the member 39 and toward the member 40, to compensate for any slight variance in the lengths of the bottles within certain limits. The cup shaped member 67 is provided with yielding inserts 71 constructed of any suitable material to form bumpers and to create a frictional engagement between the cup shaped member and the lower portion of the bottle, so that when the cup shaped member is rotated in a manner to be hereinafter set forth, the bottle will also be rotated and the bottle being frictionally gripped between the members 67 and 51, the latter will also be rotated in the bearing 64.

An ejector 72 is provided in the cup shaped member 67 and is provided with a stem 73 which latter projects into the tubular stem 68. An elastic member 74 is provided within the stem 68 to engage suitable shoulders so that the stress of the elastic member will tend normally to force the ejector 72 in a direction with respect to the cup 67, to discharge the bottle therefrom.

The cup shaped member 67 is adapted to be rotated in its bearing 69 in any suitable manner but preferably by means of a gear 75 which is connected with the stem 68 for rotation therewith in any suitable manner, and this gear 75 engages a rack or gear segment 76, (see also Fig. 12), at a certain portion of the rotation of the bottle carrier, to rotate the bottle. The gear 75 is held against rotation during the remaining portion of the travel of the carrier in any suitable manner but preferably by means of anti-friction rollers 77 which are connected with a disk 78 and which anti-friction rollers engage and travel upon a guide 79 carried by a fixed support 80, preferably the same support which holds the rack 76. The extremities 81, 82 of the guide 79 may be beveled as shown more clearly in Fig. 12, so as to permit the anti-friction rollers to pass on and off of the guide, and one of the extremities of the guide is arranged adjacent each extremity of the rack 76, so that just as the gear 75 passes into engagement with the rack 76, it will pass off of the end 81 of the guide 79, and as the gear passes out of engagement with the other end of the rack 76, it will pass on to the other end 82 of the guide 79. Obviously any number of these coöperating sockets or clamps for bottles may be provided in the bottle carrier but in the present exemplification of the invention eight are shown, and the mechanism is so timed that the bottle carrier upon each movement will advance the bottles one eighth portion of a revolution of the carrier.

The bottles are presented to the carrier in any suitable manner, but preferably by means of an endless conveyer 83, (see particularly Fig. 5), and which conveyer is provided with the pockets or seats 84 into which the bottles 52 are placed, from one end of the machine. This conveyer is preferably of the type embodying two endless belts which carry the pockets or seats, and the belts pass over spaced sprockets 85, (see Figs. 5 and 6), and which sprockets are secured to a sleeve or hollow spindle 86, the latter being journaled upon a shaft 87, and which shaft is journaled in suitable bearings supported by the frame members 35. Additional spaced sprockets are supported by the frame members 35 by means of a suitable extension designated generally by the reference numeral 89, and which extension is provided with a support 90 upon which the upper runs of the conveyer rest, and this support serves as a means for supporting the weight of the bottles in the conveyer. The conveyer may be of any desired length to accommodate any number of bottles and if desired a guard or shield 91 having a guide 92 may be arranged at the feeding end of the conveyer. An article positioning guide 83ª may also be provided. The conveyer is arranged in such a position that during its movement it will place a bottle in position between the clamping elements 51—71 of the bottle carrier so that the bottle, when the clamping members are actuated, and the carrier advanced, will lift a bottle from the carrier and carry it forward toward the label feeding mechanism.

The conveyer is actuated from the shaft 87, which is the time and main driving shaft, in the following manner, reference being had more particularly to Figs. 1, 5, 6, and 15. Secured to the end of the shaft 87, preferably beyond the frame members 35 is a Geneva drive element 93 having projections 94, preferably in the form of anti-friction rollers, extending laterally therefrom. This element 93 operates another Geneva element or wheel 95 which in turn is secured to the shaft 38 to rotate therewith, and which shaft is the supporting shaft of the bottle carrier. The Geneva drive element 93 is provided with two projections 94, in order to produce eight steps of movement of the bottle carrier in one complete rotation thereof and to necessitate two steps of movement of the carrier to advance the bottle from one station to another station, this movement being necessary in order to advance the bottle for a short distance and to then produce an interval of rest, and which interval of rest is necessary to permit certain portions of the mechanism to perform their proper functions. The provision of two of the lateral projections or rollers 94 on the element 93 results in the operation of the Geneva wheel 95 twice for every complete revolution of the element 93 so that the bottles will be advanced with a steady and uniform movement during each step of rotation of the bottle carrier, and this obviates all sudden stopping of the bottle carrier at the end of each step of movement thereof, as would be the case in the event that only one projection is employed on the Geneva drive element. Furthermore it obviates the long periods or intervals of rest which would occur in the event that only one projection is used, and during which long period of rest, in prior constructions, no operation is being performed on the article. The provision of two projections with the Geneva element results in a minimum period of rest, but which period is of sufficient duration as to permit all of the parts and mechanisms to perform their functions, and furthermore such a construction results in the production of a machine, which although intermittent in its movement and operation approaches a continuously operating machine, although itself not being a continuously operating mechanism.

Secured also to the shaft 38 and for rotation therewith is a gear 96 which meshes with an idler gear 97, and this gear in turn meshes with another gear 98, the latter being secured to the sleeve or spindle 86 for rotation therewith, and inasmuch as this sleeve or spindle is secured to the drive sprockets 85 of the feeding conveyer, manifestly the conveyer will be operated when the shaft 87 is rotated through the medium of the connections above described, as will also the bottle carrier.

The shaft 87 is itself operated from the source of power which in the present invention is shown as being an electric motor mounted upon a suitable portion of the supporting frame work and being connected by means of a pulley 100 and drive belt 101 with another pulley 102 which latter is loosely mounted upon a shaft 103 journaled in suitable bearings in the frame members 35, preferably to extend across the space between the members, and in a direction parallel with and adjacent the shaft 87. This shaft 103 is connected with the shaft 87 through the medium of intermeshing gears 104, 105, the former being secured to the shaft 103, while the latter is secured to the shaft 87. The pulley 102 is connected with the shaft 103 for rotation therewith, through the medium of the clutch elements 106, 107, the element 107 being shiftable longitudinally upon the shaft 103 but connected with the shaft for rotation therewith. This element 107 may be shifted by means of a rock shaft 108 mounted in suitable supports and which in turn is adapted to be rocked by means of a treadle 109 connected with an arm on the shaft by means of a connecting link 110. This shaft may also be rocked by hand levers 111, 112, one of which is conveniently arranged adjacent each end of the machine.

When the bottle is conveyed by the conveyer to a position that its extremities will engage the two clamping elements 51, 71, (see Fig. 10), of the bottle carrier, (see also Fig. 6), and which will be the position assumed by the foremost bottle in Fig. 5, the next operation is to clamp this bottle into the carrier. This is accomplished by actuating the clamping mechanism shown in Fig. 10, and in this present exemplification of this invention is accomplished in the following manner. Supported by one of the frame members 35 and in a position that it will enter one of the tubular portions 46 of the bottle carrier, is a plunger 113 which moves through a suitable bearing in a guide way 114. This plunger is provided with an adjustable head 115 upon which a retracting spring 116 acts and tends normally to retract the plunger. A pivoted operating dog 117 is supported by the frame member 35 in such a manner that it contacts with the head 115 of the plunger. This dog 117 is provided with an anti-friction roller 118, (see also Figs. 6 and 16), and with which roller a cam portion 119 on the Geneva drive element 93 contacts. The elastic member 116 also serves the function of holding the anti-friction roller 118 in contact with the periphery of the element 93. Before the foremost bottle on the conveyer reaches the position shown in Fig. 6 by the lowermost bottle, the plunger 113 passes to its normal or retracted position, and as the bottle reaches the position to be clamped, the Geneva drive element 93 has assumed such a position that the cam 119 thereon contracts with the roller 118 on the dog 117 to rock the latter about its pivot and thereby move the plunger 113 from the position shown in Fig. 6 to that shown in Fig. 10. This movement of the plunger 113 will cause it to contact with the plunger 57 and a further movement of the plunger 113 will force the plunger 47 in a direction to cause the clamping cup 51 to engage the mouth of the bottle and to coöperate with the cup member 71 to clamp the bottle. When the plunger 47 is moved forwardly in this manner, the dog 61 will lock it in its advanced position and will lock the bottle 52 clamped in the bottle carrier. By this time, the Geneva drive element will have moved to a position to cause the cam portion 119 to pass out of engagement with the anti-friction roller 118 on the dog 117, and the elastic member 116 will then operate to withdraw the plunger 113 out of the tubular portion 46 of the bottle carrier, into which portion the plunger entered, to advance the plunger 47, and will also move the dog 117 about its pivot and into the position shown in Fig. 6. After this completion of the operation of locking the bottle into the carrier, and the retraction of the plunger 113, the bottle carrier will then be advanced one step of rotation, and will move the bottle out of the way to permit another bottle to be advanced by the feeding conveyer. The bottle which has then been clamped in the bottle carrier is conveyed by an intermittent movement to the label affixing mechanism, which will now be described, reference being had more particularly to Figs. 2, 5, 13, 20, 21, 22, 24 and 25.

Arranged adjacent the path of movement of the bottles in the bottle carrier, and at a convenient point, is a drum designated generally by the reference numeral 120 which is provided with a series of circumferential spaced ribs 121, and this drum is rotatably supported by a shaft 122 mounted in suitable bearings, and this drum is rotated by means of a gear 123 secured to the shaft 122.

Another and preferably larger drum 124 is arranged adjacent the drum 120, and is itself provided with a series of spaced circumferential ribs 125, and the drums are so arranged with respect to each other that the ribs of one drum will stand opposite the spaces between the ribs of the other drum as shown more clearly in Fig. 20, the drum 124 being rotatably supported by means of a shaft 126 journaled in suitable bearings.

The ribs 121 are preferably provided with inserts 127, preferably constructed of rubber, or frictional substance which act upon the labels and tend to feed them to the bottles. The drum 124 is provided with cut out portions 128 extending through the ribs 125 thereof and in directions lengthwise of the drum, so that when the drum 124 is rotated, and the ribs 125 thereof contact with the ductor roll 129 to distribute paste thereon, the portions of the label 130 which extend over the spaces or cut away portions 128, (see Fig. 23), will be free from paste, while the portions of the label which contact with the ribs will have paste applied thereto as shown at 131. The ductor roll 129 is removably supported by a paste supplying tank 132, (see Figs. 1, 3 and 5), within which is arranged a paste distributing roll 133 that contacts with the roll 129, and if desired a scraper 134 may be provided adjacent the roll 133 for removing superfluous past therefrom. This tank 132 is removably supported by the main frame work in any suitable manner such as by means of arms 135 that extend from the main frame, and which arms extend into sockets 136 carried by the paste tank or pot 132. Thus it will be manifest that the tank may be adjusted upon the arms and then secured in its adjusted position.

The roll 133 is driven by means of a gear 137 connected therewith, (see particularly Figs. 2 and 3), and which meshes with a gear 138 carried by the shaft of the roller 129 and which latter gear meshes with a gear 139 connected with the shaft 126 of the roll of the drum 127, and this gear 139 also meshes with the gear 123 that is connected with the drum 120.

After the portions of the ribs 125 of the drum 124, (see particularly Figs. 5 and 12), receive the paste from the tank, and as the drum is rotated, a label 130 is supplied to these pasted ribs, from the hopper, or two labels may be supplied thereto, as shown in Fig. 25, and the label is then advanced by the rotation of the drum 124 into a position that it will pass between the drum 124 and the drum 120. In order to guide the label between the drums, and to support the label during its passage therebetween, as well as strip the label from the pasted ribs 125, guiding and supporting fingers 140 are provided, (see Figs. 12, 14, 20, 21 and 22). These fingers have portions which project into the spaces between the ribs 125, and between the drums and also portions which extend around under the drum 120, so that as the label is advanced by the drum 124, portions of the fingers 140 will extend under the label between the pasted portions 131 to strip the label from the drum, and at which time the label will be carried between the fingers 140, and the friction surfaces 127, (see Figs. 20 and 22), of the ribs 121 of the drum 120, to be conveyed by the latter drum to deflectors 141, (see particularly Figs. 12 and 21), which deflectors are held in position by a suitable support 142, one deflector extending into each groove or space between the ribs 121 of the drum 120. The label will then be deflected downwardly from the drum 120, (see also Figs. 9 and 13), into the path of movement of the advancing bottle 52, being assisted in this direction of movement by one or more pivotally supported aprons or deflectors 143 arranged in the path of movement of the forward edge of the advancing label or labels 131. Thus it will be manifest that the paste will be applied to portions of the label which do not contact with any portion of the mechanism with the exception of the paste applying ribs of the drum 124, and the label will be fed into a position that it will be engaged by the bottle, and with the pasted portion of the label facing in the direction of the advancing bottle.

Inasmuch as the advancing movement or operation of the bottle carrier is intermittent in its operation, the label feeding mechanism is also intermittent in its operation, and the supply or feed of the label is controlled by the bottle itself. That is to say when the bottle is held in the carrier and is advanced to the label receiving position, as it approaches this position, a label will be present to be supplied to the bottle. Should there be no bottle in the carrier the label would not be fed to the empty space which should be occupied by a bottle, inasmuch as the bottle will not be present, and therefore the feeding of a label for that particular bottle or the bottle which should be in the carrier, will not be performed. This operation may be accomplished in any desired or suitable manner, but a simple and efficient means will now be described.

As has already been stated the labels are fed intermittently, and for this purpose there may be provided a Geneva element 144 which is secured to the shaft 126 of the drum 124, as shown more clearly in Figs. 2, 3, 4, 6 and 17. This Geneva element 144 is actuated by another Geneva element 145 which is mounted upon a shaft 146 for rotation therewith and which shaft is journaled in suitable bearings, and which element 145 is provided with spaced projections 147 which operate upon the element 144, similar to the manner in which the element 93 operates upon the Geneva element 95, and a locking portion 145$^a$, similar to the locking portion 93$^a$ of the element 93, is provided for the Geneva element 144. A gear 148 is loosely mounted upon the shaft 146, and this gear meshes with a gear 149, connected with an upright shaft 150, and to which shaft is connected another gear 151, the latter meshing with a gear 152 secured to the shaft 87 for rotation therewith, and which shaft 87, being the time or main driving shaft, will through the medium of the connections just described cause the shaft 146 to also become a time shaft and this shaft 146 is so timed that it will have the same speed as the shaft 87.

Connected with the gear 148, preferably to the hub thereof, and for rotation therewith, is a disk or element 153, which is in the nature of a clutch element, and this element 153 coöperates with the Geneva drive element 145 to form a clutch, the latter element being provided with a shouldered portion 154 forming a recess, into which a spring controlled pin 155 carried by the element 153 is adapted to project and thereby lock the element 153 together with the gear 148 to the shaft 146 so that motion will be imparted to the latter when the shaft 87 is operated. This clutch is controlled automatically by the bottle, through the medium of a shoe 156 having a beveled portion 157 and carried by a stem 158 mounted in guides 159 and controlled by a spring 160, the spring tending normally to move the shoe 156 in a direction toward the pin 155 so that the beveled portion of the shoe will engage the beveled extremity of the pin 155 and thereby push the pin out of the raised portion 154 to normally unlock the clutch formed by the elements 145, 153. This action will take place when the bottle is not present, but when the bottle is present the shoe 156 is shifted against the tension of the spring 160 to permit the pin 155 to lock the clutch elements 145, 153 to the shaft 146. This is accomplished in the following manner. A rock shaft 161 is journaled in suitable bearings in a portion of one of the frame members 35, (see particularly Figs. 6, 17 and 18), and connected with this shaft is a crank arm 162, on which arm is arranged the shoe 156. A link 163 is connected with the arm 162, and with the shoe as at 164. Another crank arm 165 is also connected with the shaft 161, and this arm 165 is arranged within the path of the advancing movement of the bottle 52. Before the bottle reaches the arm 165, the latter will be in its depressed or lowest position, and will be held in this position by means of the spring 160, which will tend normally to move the shoe 156 in a direction to retract the pin 155 and hold the latter retracted to unlock the elements 145, 153. Thus it will be manifest that unless the shoe 156 is depressed to release the pin 155, the label feeding mechanism will not be actuated, which will be the case when there is no bottle to contact with the arm 165. When a bottle is present in the carrier, the advancing movement of the bottle will cause it to contact with the arm 165, to raise the latter, thereby rocking the shaft 161, and which shaft will, through the medium of the arm 162 and link 163, depress the shoe 156 against the tension of the spring 160 and thereby permit the pin 155 to lock the elements 153, 145. As soon as the bottle passes out of engagement with the arm 165, the latter is returned to its normal position ready to be acted upon by the next advancing bottle. When the elements 145, 153 are thus locked together, the gear 148 will also be locked to the shaft 146 so that the latter will be rotated from the shaft 87 and the rotation of the shaft 146, imparts motion to the Geneva drive element 145, which latter will in turn actuate the Geneva element 144 to rotate the shaft 126 and with it the drum 124, to feed a label. Obviously if desired, a hand lever 166 may be provided, connected with the shaft 161 to actuate the latter when desired, and regardless of the presence of a bottle.

When the label is fed between the drums or rolls 121, 124, it will be advanced with the bottle to which it is to be applied, and out of contact therewith, for some distance, yet the feeding movement of the label will be such that one edge of the label will be in advance of the bottle, so that it will assume a position between the bottle and the deflector aprons 143, as shown more clearly in Figs. 5, 12 and 13, by the time the bottle contacts therewith. When the edge of the label contacts with the bottle, they will both be advanced during the next movement of the bottle carrier and in contact with each other until the entire label is supported by the bottle. During this advancing movement, the anti-friction rollers 77 on the disk 78 (see particularly Fig. 12), will be traveling upon the guide 79, to prevent the bottle from being rotated, and in order to make the forward edge of the label adhere to the bottle, it is necessary to exert some pressure thereon, which will also hold the label from slipping from the bottle. This may be accomplished in any suitable manner, but a simple and efficient means embodies a brush 167 which is supported in a frame 168 pivoted as at 169 to a support 170 and the latter is swiveled as at 171 in a fixed support 172 mounted upon a fixed portion of the frame work, preferably the portion 37 connecting the frame members 35. A rod 173 is pivotally connected to the support 172, and nuts 175 are connected with the end of the rod 173 for adjusting the position of the support 168 and this spring preferably abuts the guide 174, and a shoulder on the link, and tends normally to hold the brush 167 yieldingly in the path of the advancing movement of the bottle to which the label is being applied. If desired the brush may be provided with a beveled face over which the bottle passes, and an anti-friction roller 178 may be provided on the support 168, (see Fig. 26), adjacent the brush. Among the more important functions of the roller is to protect the brush, inasmuch as it will contact with the bottle when the brush is returned from its deflected position to the normal position, under the influence of the spring. During this portion of the labeling operation, the bottle is held against rotation with respect to the bottle carrier by means of the guide 79, and the front edge of the label will be smoothed or pressed against the surface of the bottle by the brush 167. After the bottle has passed the brush 167, another brush 179 is encountered by the bottle and label, and after the bottle has moved for a short distance in engagement with the brush 179, the gear 175 will contact with the rack 76, and the anti-friction rollers 77 will be moved out of contact with the guide 79.

Inasmuch as the rack 76 is fixed or stationary, and the gear 75 will be in contact therewith, it will be manifest that a further advancing movement of the bottle carrier will result in a rotation of the bottle with respect to the bottle carrier. As the brush 179 contacts with the label which is applied to the bottle, and the bottle is rotated, the label will be smoothed over the surface of the bottle, and if desired another brush 180 may be arranged adjacent the path of movement of the bottle in the carrier, to contact with the label and further smooth the label and remove any air or irregularities in the label, that may be present when the bottle reaches this brush. These brushes are arranged between the point where the label is applied to the bottle, and the point of discharge of the bottle from the carrier, and obviously any number of these brushes may be employed as may be necessary or desired. With this improved construction and arrangement, and the manner of feeding and applying the label to the bottle, it will be manifest that the entire label including all of the edges thereof will be securely fastened to the bottle, and when the bottle is discharged from the machine, or when it passes these brushes, the label will be so secured thereto that there will be no projecting or loose edges. After the bottle with the label applied thereto has passed out of engagement with the last one of the brushes, the gear 75 will then pass out of engagement with the rack 76, and one extremity of the guide 79 is so arranged that just as the gear 75 passes out of engagement with the rack, the anti-friction rollers 77 will then pass into engagement with the rack to hold the bottle against rotation with respect to the bottle carrier. The gear 75 passes out of engagement with the rack at a point adjacent the discharge of the bottle from the bottle carrier, and the rack and gear, as well as the guide 79, are preferably so arranged and timed with respect to each other, that just as the bottle is arrested in its rotary movement with respect to the bottle carrier, the portion of the bottle containing no label will be lowermost, as shown more clearly in diagram in Fig. 13. This is particularly advantageous inasmuch as it presents an unlabeled surface of the bottle to the conveyer which conveys the bottle away from the bottle carrier, thereby holding or maintaining the label out of contact with the conveyer or any portion of the mechanism by which the label might be marred or even mutilated.

As the bottle reaches the point of discharge, (particular reference being had to Figs. 5, 11 and 15), the anti-friction roller 66 on the dog 61 contacts with a cam 181 which is arranged in the path of movement of the anti-friction roller and is supported by any suitable fixed portion of the mechanism, preferably one of the frame members 35. The operation of this cam 181 upon the anti-friction roller 66, caused by the advancing movement of the bottle carrier, is to rock the dog 61 about its pivot 62 and against the stress of the elastic member 65. This operation will move the nose 63 of the dog 61 out of engagement with the notches 64 on the plunger 47, thus releasing the plunger. When released, the stress of the elastic member 49 acting upon the head 48 of the plunger will automatically retract the plunger from the position shown in Fig. 10 to that shown in Fig. 11, thereby releasing or unclamping the bottle, and at the same time the ejector of the opposite clamping element will automatically perform its function to shift the bottle. The plunger 47 will be retained retracted until the bottle carrier advances this plunger to a position to be acted upon by the plunger 113 and which latter acts upon the former plunger in the manner already described to again clamp another bottle in to the carrier.

Just at the completion of the operation of the releasing and retracting of the plunger 47, the bottle will be delivered into one of the pockets 182 (see particularly Fig. 5), of another conveyer 183, preferably of the endless type and embodying spaced endless belts or chains which pass over spaced sprockets 184 and also spaced sprockets 185, (see particularly Fig. 19), and which sprockets 185 are keyed to a shaft 186 journaled in suitable bearings. The pockets 182 are connected with the endless elements of the conveyer and a support 187 is provided for supporting the upper runs of the endless elements, and consequently the weight of the bottles which are being delivered from the bottle carrier. This conveyer 183 may be of any desired length to convey the bottles away to any point, and the conveyer is intermittently actuated from the shaft 38 of the bottle carrier, (see particularly Figs. 1, 2, 3, 5, 9 and 11,) through the medium of a gear 188 secured to the shaft 38 for rotation therewith. This gear 188 meshes with a gear 189 secured to a shaft 190 for rotation therewith, and which shaft is journaled in suitable bearings.

The shaft 190 extends to the rear of the machine, and preferably at right angles to the shaft 38, and is of any desired length, according to the length of the conveyer 183. The shaft being of such a length that the extremity thereof preferably terminates adjacent the rear end of the conveyer 183 and has secured thereto a gear 191. This gear 191 meshes with another gear 192 connected with a shaft 193, which latter is preferably arranged in an upright position, (see particularly Fig. 11), and journaled in suitable bearings. One extremity of this shaft 193 preferably projects for some distance below the conveyer 183, and secured thereto is a gear 194, which latter meshes with a gear 195 connected to a shaft 196, the latter being journaled in suitable bearings and arranged below the shaft 186. This shaft 196 preferably extends beneath the conveyer 183 and has secured thereto and for rotation therewith a gear 197, which in turn meshes with a gear 198, the latter being secured to a shaft 199 journaled in suitable bearings. This shaft 199 is preferably arranged between the shafts 196 and 186 and also supports a Geneva drive element 200, and which element is connected with the gear 198 for rotation therewith. Connected with the conveyer 183, and preferably with the shaft 186 and for rotation therewith, is a Geneva element 201 with which the drive element 200 coöperates, and the element 200 is preferably provided with lateral projections 202, to impart an intermittent rotation thereto, and consequently an intermittent advancing movement to the conveyer 183. Thus it will be manifest that when the bottle carrier is actuated from the time or main driving shaft 87, the conveyer 183 will also be actuated so that after a bottle has received its label and is advanced to the discharging point from the carrier, the conveyer 183 will have been moved to present a pocket 182 to the bottle to receive the latter from the bottle carrier, just about the time that the cam 181, (see Figs. 11 and 15), operates upon the dog 61 to unclamp the bottle.

It will be noted that the bottles are supplied to the bottle carrier in a substantially horizontal position, and in which position they receive the label. They are also maintained in a substantially horizontal position while they are being rotated with respect to the carrier and while the label is being applied thereto. In order to present the bottles in a convenient position to the operator for removing them from the machine, means are provided for tilting them from a substantially horizontal to an upright position, and which operation serves as a means for removing the bottles from the conveyer 183. Any suitable mechanism may be provided for this purpose, but a simple and efficient means comprises a chute 203, (see particularly Figs. 3 and 11), and which chute is preferably arranged adjacent the shaft 193, and near one end of the conveyer 183. Connected with the shaft 193 is a hollow hub or member 204 which is provided with radially projecting wings or partitions 205 and which wings are preferably arranged in the form of a star wheel, so that when one of the bottles is ejected from the conveyer and passes down the chute 203, the latter being arranged in an inclined position, the bottle will pass into the space between two of these wings 205. A yielding platform or bumper 206, of any desired and suitable construction, is provided at one end of the chute 203 to receive the bottles as they pass out of the chute.

With the bottle in its upright position between the wings 205, it will be manifest that when the shaft 193 is rotated, in the manner already described, the bottle will be moved away from the chute 203, and a shield 207, (see Fig. 3), may be provided for holding the bottle in the space between the wings.

Another shield 208, may also be provided for shifting the bottles longitudinally in the pockets 182 as they approach the chute 203, and so as to project the bottom end of the bottle sufficiently beyond the pocket 182 to position it so that it may be readily tilted from the pocket into the chute.

Another star wheel 209 is arranged adjacent the star wheel 205 and is so arranged that it will receive the bottles from the star wheel 205, and a shield 210 coöperates with the star wheel 209 to hold the bottles against displacement with respect thereto and while they are being advanced thereby. Motion is imparted to the star wheel 209 preferably from the shaft 193 through the medium of the gear 194, (see particularly Figs. 2, and 19), and which gear meshes with a gear 211 secured to a shaft 212, and connected also with the shaft 212 is a gear 213 which latter meshes with a gear 214 secured to the shaft 215 of the star wheel 209. The bottles are advanced by the star wheel 209, and are delivered thereby to a conveyer 216, preferably of the endless band type, and upon which the bottles rest in an upright position. This conveyer 216 may extend in any direction to convey the bottles to a delivery platform or table 217 from which they may be removed as desired, the platform being supported in any suitable manner, preferably by one or more arms in the form of rods 218, extending from the frame members 35. This conveyer 216 passes over pulleys 219, 220 suitably supported, and a tension device 221 may be provided, for taking up the slack in the conveyer 216, and which device is common with structures of this character. The conveyer 216 also receives its motion, from the shaft 193 which in turn drives the shaft 212 as above described, and secured to this shaft 212 is a gear 222, which in turn meshes with a gear 223, the latter being secured to a shaft 224, and to which shaft is secured the pulley 219 over which the endless band conveyer 216 passes. Thus it will be manifest that all of the parts and mechanisms receive their motion either directly or indirectly from the time or main driving shaft 87, and the parts all operate in unison, and intermittently so as to produce the desired and necessary intervals of rest during the passage of the bottle through the machine, and which intervals of rest are necessary in order to permit the operation of the various parts of the mechanism and to permit them to perform their functions at the time when the bottle is presented to such mechanisms for their operation thereon.

The preferred mechanism for tilting the bottles from the conveyer into the chute 203, (see particularly Figs. 1, 3, 5, and 11), embodies an arm 225 arranged adjacent the path of movement of the conveyer so as to engage the mouth end of the bottle. This arm is pivotally supported as at 226 upon a suitable support 227, and a slide 228 movable in guide ways 229 is pivotally connected as at 230 with the arm 225, so that when the slide is moved in its guides the arm will be rocked about its pivot to engage the extremity of the bottle, when the arm is moved in one direction, and to position the arm when moved in the opposite direction, so that the next advancing bottle will be engaged by the arm when the latter is moved in an operating direction.

The slide is preferably moved in its guides by means of a link 231 which is pivotally connected as at 232 with the slide, and the lower extremity of the link is preferably bifurcated as at 233, to stand astride of the shaft 196, and which bifurcation acts as a means for limiting the pivotal movement of the link 231. An anti-friction roller 234 is carried by the link 231 and coöperates with a disk 235, secured to the shaft 196 and which disk is provided with a plurality of cam surfaces 236, and which cam surfaces are adapted to engage the anti-friction roller 234 to raise the slide 228 when the disk is rotated. Any number of these cam surfaces may be provided according to the timing it is desired to produce, in the operation of the arm 225, and if desired a spring 237 may be provided, which is connected by one extremity to the slide 228, and is anchored by its other extremity, and operates to return the arm and slide after it has been moved in one direction by one of the cam surfaces.

As has already been stated, one or more labels may be fed to the bottle, as it is sometimes desired to place a label around the neck of the bottle as well as around the body portion thereof, as will be seen more clearly in Fig. 26. In order therefore to supply both of these labels, and in order to apply the label properly about the neck of the bottle so that it will be held in the proper position on the bottle, the hopper designated generally by the reference numeral 238 in Fig. 25 is arranged at an angle to the hopper designated generally by the reference numeral 239 in said figure. Thus it will be seen that the label 130 in Fig. 25 which is being supplied to the body of the bottle will be fed in a straight position with respect to the rollers or drums 124, 120, but the label 240 which is to be applied to the neck of the bottle, will be fed thereto in a position inclined with respect to the label 130, although both of these labels may be fed simultaneously to the article.

In order to accommodate labels of varying sizes, the hoppers 238, 239 are adjustably constructed, and preferably comprise walls 241, arranged opposite to each other and walls 242 which are also arranged opposite each other. The hoppers are preferably supported by a frame embodying side bars 243 and end members 244 connected together, the frame being supported by means of uprights 245, preferably secured to the end members 244 which uprights move in guides 246 carried by the main supporting frame of the machine, as will be later described. The hoppers are supported by the side bars 243 to extend across the space therebetween, and the support and hoppers are arranged so that the hoppers will be above and in close proximity to the drum 124, (see particularly Figs. 1, 5, and 24). In order to permit the hopper 239 to be adjusted lengthwise of the drum 124, it is adjustably supported on the bars 243, preferably by means of sleeves 246 encompassing the bars and held in position by means of set screws 247. The end members 242 of the hopper are connected with these sleeves 246 by means of spindles 248 to form a swivel joint with the sleeves, and set screws 249 are provided for holding the members 242 against swiveling movement. This construction is advantageous, when it is desired to arrange the hopper at a slight angle, the swivel joint or connections permitting of such adjustment of the hopper, and after the hopper has been moved to the desired position, the set screws may be tightened.

Followers 250 are adjustably supported by the walls 242, by means of extensions or spindles 251, and set screws 252 are provided, which engage the spindles 251 for holding the followers 250 in position. These followers are provided with lips or extensions 253 which project under the edges of the lowermost label, and serve as a means for supporting the pile of labels. A weighted follower 254 is provided in the hopper thus formed, and which rests upon the pile of labels to hold them in position. This weight 254 is curved or arched as shown in Fig. 5, and serves to cause the pile of labels to assume the same shape, that is so that they will be maintained in an arched position, to form an arch concentric with the periphery of the rotatable drum 124, so that they will be properly fed to and positioned upon the drum when the hopper is lowered to cause the label to contact with the ribs of the drum.

The hopper 238 is similarly constructed and it will be manifest that the swivel support for the walls 242 will permit the hopper to be arranged at an angle with respect to the other hopper 239, as shown more clearly in Figs. 22, 25.

As has already been stated the hoppers are arranged preferably above but in close proximity with the drum 124. It will thus be manifest that inasmuch as the ribs 125 on the drum receive a supply of paste from the roller 29, (see Fig. 5), as the drum is rotated, and inasmuch as the hoppers are arranged in close proximity to these ribs and the fingers 253 being arranged to enter the spaces between the ribs, the pasted surface of the ribs will as the drum is rotated, contact with the face of the lowermost label which is exposed through the open bottom of the hopper and will apply the paste to this face of the label in the manner shown in Fig. 23.

The label is removed from the hopper by the drum inasmuch as the label will adhere to the ribs which have the paste applied thereto, and the cut out portions 128 of the ribs will permit the label to have a surface intermediate its edges upon which no paste is applied. As the label adheres to the drum, and the latter is rotated, the label will be withdrawn from the hopper and will be fed forwardly to meet the advancing article or bottle 52, and during which feeding movement it will pass from the drum 124 on to the guiding and supporting fingers 140, which will also act as a stripper for the label from the drum, and then between the fingers 140 and the frictional surfaces 127 of the ribs 121, until the forward edge of the label encounters the deflector 141, which will in turn deflect the forward edge of the label against the aprons 143, to cause such edge of the label to be directed across the path of movement of the advancing article, and between the article and the brush 167, and in which position it will be engaged by the article in a manner as has already been described.

The hoppers 238, 239 are adapted to be bodily reciprocated, or to be raised and lowered in directions toward and away from the drum 124, so that when the hoppers are lowered, the lowermost or exposed label, in the bottom of the hoppers, will be brought into contact with the faces of the ribs 125 of the drum and to which ribs the paste has been applied. After the label has adhered to these ribs, the hopper is then raised so that the lowermost label will be stripped or removed from the hopper, and to move the hopper out of the way of the label which is to be advanced by the drum. This may be accomplished in any desired or suitable manner, but a simple and efficient means for accomplishing this result will now be described.

The uprights 245 are each provided with a slot 255 through which the shaft 126 passes, and this shaft is journaled in suitable bearings in the guides 246, (see particularly Figs. 1 and 6).

Connected with the shaft 146 are spaced cams 256, preferably of the box type, and carried by each of the uprights 245 are anti-friction rollers 257, one of which coöperates with each of the cams 256. Inasmuch as the shaft 146 is intermittently rotated, it will be manifest that the rotation of this shaft will through the medium of the cams 256 and the uprights 245, impart an intermittent reciprocation, or raising and lowering movement to the hoppers 238, 239. This shaft 146 as has been stated, operates in the nature of a time shaft, and the mechanism is so timed that the hoppers will be lowered at the proper interval, or when the portion of the ribs 125 of the drum 124, that have the paste applied thereto, are in a position beneath the open bottom of the hopper to receive the lowermost label, and which they will do when the hopper is lowered. When the hopper is raised, the lowermost label will adhere to and remain on the ribs 125, to be advanced by the drum when the latter is rotated.

In order to prevent overthrow of the shaft 146, due to the momentum of the mechanism, a friction device may be provided, if desired and which friction device may be of any ordinary and well known structure, as designated generally by the reference numeral 258 in Figs. 3 and 6, and is applied to the shaft 146.

In the form of the invention shown in

Fig. 27, the means operating to smooth the label about the article, after the label has been brought into contact with the article, embodies a fixed surface 259 which is arranged adjacent the path of movement of the article and is supported by any fixed portion of the frame. This surface 259 is preferably curved as shown and is provided with a cover 260 which latter is constructed of any suitable friction material, preferably of felt or the like, and is removably secured to the surface by means of fastening devices 261. The surface 259 preferably forms one wall of a chamber 262, and if desired a pipe 263, or other suitable opening may be provided for supplying the chamber 262 with a heating medium such as steam or the like, and the surface 259 is of such a construction that the heat from the chamber will be applied to the material 260. Thus it will be manifest that inasmuch as this surface is arranged adjacent the path of movement of the advancing articles, and as the articles contact therewith, and are also rotated while in engagement with such surface, the label will be pressed against the surface of the article while the latter is being advanced and rotated and smoothed out over the surface.

In the form of the invention shown in Fig. 28, the bottle carrier comprises a plurality of radial arms 264, which carry pockets 265 and into which pockets the bottles 266 rest. The bottle with this form of the invention is shown as being angular in cross section, and the pockets 265 for receiving the bottles are correspondingly constructed. In order to press the label against the bottle, and while the bottle is held against rotation with respect to the carrier, by means of the shape of the bottle and pocket, there is provided a pivotally supported arm 267, having a roller 268 connected therewith, and which roller may be constructed of any desired material, or covered with any suitable material. The roller is adapted to engage the label as the article is advanced, and an adjustable tension device 269 such as a spring, is provided for acting upon the arm, to hold the roller 268 in yielding engagement with the label and article. A stop device 270 may be provided for limiting the movement of the arm 267 by the tension device 269.

If desired another arm 271 pivotally mounted as at 272, may be arranged adjacent the path of movement of the article, and this arm supports a brush 273 also adapted to contact with the label to smooth it over the article. A weight 274 is provided and is adjustably mounted on an arm 275 connected with the arm 271, and tends normally to move the brush 273 into and hold it within the path of movement of the advancing article. A stop pin 276 may be provided for limiting the movement of the arm 271 under the influence of the weight 274.

In the form of the invention shown in Fig. 29, a rack 277 is provided adjacent the point when the label meets the article, and the shield or apron 143, shown in Fig. 12, is dispensed with. In lieu of this shield a brush 278 is provided adjacent the point where the label meets the article, so that just as the label meets the article, the bottle will be rotated by the rack 277 engaging the gear 75, (see Fig. 12), and this brush operates to first seal the forward edge of the label against the article and then to smooth the label over the surface of the article while the article is being advanced and rotated. This brush 278 is also preferably located adjacent the stripper 271. If desired one or more additional brushes 279 may be provided and arranged adjacent the path of movement of the advancing article, and after it has left the brush 278.

It is thought that the operation of this improved machine will be fully and clearly understood from the above description, but briefly and generally stated the operation is as follows: The bottles are first placed upon the receiving conveyer in any suitable manner and are then intermittently advanced to the bottle carrier where they are received and automatically clamped into the carrier. As the carrier is operated, the bottle will be intermittently advanced in a direction toward the label feeding mechanism, and when the bottle in the carrier has reached the position to engage and actuate the arm 165, and to render active the label feeding mechanism, the label will be fed from the hopper by means of the drum 124 to the article, and in the same general direction of the article, out of contact therewith, during a portion of the advancing movement of the article or bottle. If there should be no bottle in the carrier to trip the arm 165, (Fig. 5) the label feeding mechanism will remain inactive, and consequently no label will be fed by the mechanism. When fed, the label will also be positioned by the feeding mechanism so that its forward edge will be projected across the path of the advancing movement of the article, or into a position that the article will contact with the label. As the article is then advanced, the label will be simultaneously advanced, and this advancing movement will cause the forward edge of the label to be pressed against the article by the yieldingly supported presser element 167. During all of these movements of the article, the latter is held against rotation with respect to the carrier by means of the guide 79 and the anti-friction rollers 77. After the article and label have passed over the yieldingly supported presser element 167, the bottle which has the label connected therewith will pass into engagement with a brush 179, reference being had particularly to Figs. 5 and 12. A further advancing movement of the article will cause the gear 75 to contact with the rack 76, and a still further advancing movement of the article, will cause the latter to be rotated with respect to the carrier, due to the engagement of the rack and gear. It will be manifest that the hopper is raised entirely before the commencement of the advancing movement of the drum, and when the hopper reaches the limit of its upward movement the label feeding mechanism will start to operate. This will permit the proper feeding or position of the label with respect to the article, because the parts and mechanism which control the feeding or positioning of the label, are so arranged and timed, that during the period of rest of the advancing article, the label will have assumed a position that a sufficient amount of the label will be projected or suspended from the label feeding mechanism and into the path of movement of the advancing article as to be contacted therewith. Then, during the further advancement of the article with the label in contact therewith, another label is being similarly fed and positioned for the next advancing article. As the bottle contacts with the projecting portion of the label and is advanced therewith, the remaining portion of the label is being positively fed to the article by the feeding mechanism. During the interval between the time when a label is completely discharged from the feeding mechanism to the article, and while the next article is being advanced to the point where it first received the label, the feeding mechanism occupies that period to feed the next label and to cause it to assume a position that a portion of the label will be suspended in the path of the advancing movement of the article due to the fact, that in one complete cycle of operation, one full advancement of the label takes place, and as approximately one half of the length of the label is advanced into the path of movement of the article, at the time of the beginning of the cycle of movement of the article, it is obvious that the remaining portion of the label remains in the label feeding mechanism to be advanced by the mechanism simultaneous with the article, and which latter operation also advances the front portion of the succeeding label, so that a portion of the latter, similar to the preceding label will be projected thereby, into the path of movement of the next advancing article. This rotation of the article with respect to the carrier, preferably continues during the further advancing movement of the article and while the article is brought into engagement with additional smoothing brushes, if they are employed. When the article having the label applied thereto has reached its point of discharge from the carrier, the gear 75 will pass out of engagement with the rack 76 and the anti-friction rollers 77 will then pass into engagement with another portion of the guide 79, to hold the article against rotation with respect to the carrier. The article is then automatically released or unclamped from the carrier and is deposited into another conveyer which conveys the bottle away from the carrier.

When the article reaches the point of discharge from the bottle carrier, it will be in such a position that the unlabeled portion thereof will be lowermost, or in a position that this unlabeled portion will engage and rest upon the conveyer and thereby protect the label. This position of the label at its discharge point is obtained through the timing and arrangement of the various parts of the mechanism. After the bottle is delivered upon the conveyer, it is intermittently advanced through the medium of suitable mechanisms to a point where the bottle is slightly shifted upon the conveyer so as to position it to be engaged by a mechanical tilting mechanism, (see particularly Fig. 19), and which latter mechanism operates in unison with the conveyer to tilt the bottles from the conveyer and into a chute, at the bottom of which chute is arranged a yielding bumper. This changes the position of the bottle from a substantially horizontal to an upright position, and when in this upright position the bottle is advanced by another conveyer or series of conveyers to be deposited upon another conveyer, 216, the latter being preferably in the form of an endless belt, that operates to convey the bottle on to a receiving platform or table 217, (see Fig. 2), and from which platform the bottles may be removed as desired.

Should it be desired to stop the mechanism at any point in its operation, this is readily accomplished by actuating, or rendering inactive the clutch mechanism shown in Fig. 6 through the medium of a treadle or hand levers, (see Fig. 1), arranged at a convenient point for the operator, preferably one handle being arranged adjacent each end of the machine, and the treadle being arranged at an intermediate point.

While the bottle carrier has been herein shown and described as being separate from the feeding and removing conveyer, and operating to lift the bottle from one and to deposit it upon the other, after the labels have been applied thereto, there may be provided a straight conveyer upon which the bottles are placed and remain during the entire labeling operation, and which conveyer conducts the bottle entirely through machine. Likewise should the label be of such length as to extend into the pockets in which the bottle with the label applied thereto rests, then protecting devices such as rollers may be employed in the pockets to permit side shifting of the bottle without danger of scraping or injuring the label. Obviously braces and supports may be provided wherever desired, and the mechanisms are all supported in any convenient or suitable manner.

While the present invention has been described as being applicable to labeling bottles, it is obvious that it may be employed for labeling other articles, and while the preferred form of the invention has been herein shown and specifically described, it is to be understood that various changes may be made in the details of construction and arrangement of the several parts, and also in the timing of the various mechanisms, without departing from the spirit of this invention.

What is claimed as new is:—

1. A labeling machine embodying a rotatable intermittently operating drum-like carrier adapted to receive and clamp the articles to be labeled, intermittently operating label feeding mechanism embodying rotatable elements between which the label is fed to the article, one of the elements being disposed adjacent the path of movement of the article in the carrier to feed the label in a direction across the path of the advancing article to be engaged by the latter, said feeding mechanism positively feeding the label in the same general direction as the advancing movement of the article after a portion of the label contacts with the article to overcome drawing of the label from the feeding mechanism by the article, and means adapted to contact with the label to smooth the label about the article and during the advancing movement of the article.

2. A labeling machine embodying a rotatable intermittently operating drum like carrier adapted to receive and clamp the article to be labeled, intermittently operating label feeding mechanism embodying rotatable elements between which the label is fed to the article and in the same general direction as the advancement of the article and out of contact with the article, one of said elements being disposed adjacent the path of movement of the article in the carrier to feed a portion of the label into a position to be met by the advancing article, and to positively feed the remaining portion of the label to the article after one portion has engaged the article to overcome drawing of the label from the feeding mechanism by the article, and means for smoothing the label over the surface of the article, the said means and label being relatively movable one with respect to the other.

3. A labeling machine embodying a rotatable intermittently operating drum-like carrier for the article to be labeled, label feeding mechanism embodying a rotatable element adjacent the path of movement of the article in the carrier, means for actuating the latter to feed the label in unison with the advancement of the article, said feeding mechanism also operating to position a portion of the label across the path of the advancing movement of the article, said rotatable element positively feeding the remaining portion of the label to the article and in the same general direction as the advancing movement of the article, to overcome drawing of the label from said mechanism by the article, means for pressing the forward edge of the label against the surface of the article, and means for smoothing the label over the surface of the article.

4. A labeling machine embodying a carrier for the article to be labeled, means for actuating the same, label feeding mechanism, means for actuating the latter to feed the label in unison with the advancement of the article, and to position a portion of the label across the path of the advancing movement of the article, said mechanism embodying a rotary element engaging the label to positively feed the remaining portion of the label to the article and in the same general direction as the advancing movement of the article to overcome drawing of the label from the mechanism by the article, means for pressing the forward edge of the label against the surface of the article, and means adapted to engage the label for smoothing the latter over the surface of the article, the last recited means and the article and label being relatively movable.

5. A labeling machine embodying a rotatable drum-like carrier for the article to be labeled, means for actuating the same, label feeding mechanism, embodying a rotatable element operating to feed the label in unison with the advancement of the article and to position a portion of the label across the path of the advancing movement of the article, said element also operating to positively feed the remaining portion of the label to the article and in the same general direction as the advancing movement of the article to overcome drawing of the label from said mechanism by the article, means for pressing the forward edge of the label against the surface of the article, and means adjacent the path of movement of the article by the carrier and adapted to engage and smooth the label over the surface of the article when the article is advanced.

6. A labeling machine embodying a rotary drum like carrier for receiving and advancing the article to be labeled, label feeding mechanism, means common to both for actuating them in unison, said label feeding mechanism embodying a rotary element adjacent the path of movement of the article and operating to feed the label in the same general direction as the advancing movement of the article and to move a portion of the label into the path of the advancing article to be met thereby, and to positively feed the remaining portion of the label to the article after the first said portion contacts with the article to overcome drawing of the label from said mechanism by the article, and means for smoothing the label on the surface of the article, the last recited means and the label and article being relatively movable, whereby the entire surface of the label will be smoothed by said smoothing means.

7. A labeling machine embodying a carrier for the article to be labeled, mechanism for actuating the same to advance the article, label feeding mechanism operating in unison therewith to positively feed the label to the article and in the same general direction as the advancing movement of the article as it is applied thereto to overcome drawing of the label from the label feeding mechanism by the article, said label feeding mechanism embodying a yielding guide for directing the forward edge of the label in a direction across the path of movement of the advancing article, and means for smoothing the label over the surface of the article.

8. A labeling machine embodying a carrier for the article to be labeled, mechanism for actuating the same to advance the article, label feeding mechanism operating in unison therewith to positively feed the label to the article as it is applied and in the same general direction of the advancing movement of the article, to overcome drawing of the label from the label feeding mechanism by the article, said label feeding mechanism embodying a swingingly supported guide for directing the forward edge of the label in a direction across the path of movement of the advancing article, and means for smoothing the label over the surface of the article.

9. A labeling machine embodying article feeding mechanism, label feeding mechanism, and means for causing an intermittent operation of the label feeding mechanism, the said means embodying a Geneva element, and a driving element therefor, the said driving element being provided with spaced projections adapted to successively operate upon the said Geneva element for causing two steps of said Geneva element upon each complete rotation of said driving element.

10. A labeling machine embodying article feeding mechanism, label feeding mechanism, and means for causing an intermittent operation of the label feeding mechanism, the said means embodying a Geneva element, a driving element therefor, and provisions for imparting to the Geneva element two steps of movement upon each complete rotation of the said driving element.

11. A labeling machine embodying article feeding mechanism, label feeding mechanism, and means for causing an intermittent operation of the label feeding mechanism, the said means embodying a Geneva element, a driving element therefor, provision for causing two steps of movement of the Geneva element upon each complete rotation of the said driving element, and means controlled by the article for controlling the operation of the Geneva element.

12. A labeling machine embodying article feeding mechanism, label feeding mechanism, and means for causing an intermittent operation of the label feeding mechanism, the said means embodying a Geneva element, a driving element therefor, provisions for causing two steps of movement of the Geneva element upon each complete rotation of the said driving element, and means actuated by the advancing article for controlling the operation of the Geneva element.

13. A labeling machine embodying article feeding mechanism, label feeding mechanism, and means for causing an intermittent operation of the label feeding mechanism, the said means embodying a Geneva element, a driving element therefor, provisions for causing two steps of movement of the Geneva element upon each complete rotation of the said driving element, and a controlling arm arranged in the path of movement of the advancing article to be engaged and shifted thereby, for controlling the movement of the Geneva element.

14. A labeling machine embodying article feeding mechanism, label feeding mechanism, and means for causing an intermittent operation of the label feeding mechanism, the said means embodying a Geneva element, a driving element therefor, provisions for causing two steps of movement of the Geneva element upon each complete rotation of the said driving element, and means controlled by the article for controlling the operation of the Geneva element, the said means embodying a clutch device and an element adapted to be engaged and shifted by the article.

15. A labeling machine embodying a rotary drum like article feeding and holding mechanism, rotary label feeding mechanism, means common to both for actuating them, said label feeding mechanism operating to feed the label into the path of movement of the article to be contacted therewith and while the article is held in said mechanism, and means controlled by the article for controlling the label feeding mechanism.

16. A labeling machine embodying a rotary drum like article feeder and holder, label supplying mechanism embodying a rotary label feeding element, provisions whereby said element will apply an adhesive substance to one face of the label, provisions for causing the label and article to be brought into contact and while the article is held by said mechanism, and provisions for stripping the label from the said element and presenting that face of the label which contains the adhesive substance to the article.

17. A labeling machine embodying a rotary drum like article feeder and holder, label supplying mechanism embodying a rotary label feeding element, provisions whereby the said element will apply an adhesive substance to one face of the label, provisions for causing the label and article to be brought into contact and while the article is in the holder, provisions for stripping the label from the said element and presenting that face of the label which contains the adhesive substance to the article, and provisions whereby the operation of the said element will be controlled by the article.

18. A labeling machine embodying a rotary drum like article feeder and holder, label supplying mechanism embodying a rotary label feeding element, provisions whereby said element will apply an adhesive substance to one face of the label, provisions for causing the label and article to be brought into contact and while the article is in the holder, provisions for stripping the label from the said element and presenting that face of the label which contains the adhesive substance to the article, and provisions for smoothing the label over the surface of the article.

19. A labeling machine embodying a rotary drum like article feeder and holder, label supplying mechanism embodying a rotary label feeding element, provisions whereby said element will apply an adhesive substance to one face of the label, provisions for causing the label and article to be brought into contact and while the article is in the holder, provisions for stripping the label from said element and presenting that face of the label which contains the adhesive substance to the article, and label affixing provisions embodying means for pressing the forward edge upon the article, and means for smoothing out the label.

20. A labeling machine embodying a rotary drum like article feeder and holder, label supplying mechanism embodying rotary label feeding elements between which the label passes, adhesive applying mechanism, means for stripping the label from one of the feeding elements whereby the label will be fed across the path of advancing movement of the article, and means for pressing the label about the surface of the article and while the article is in the holder.

21. A labeling machine embodying article feeding mechanism, label supplying mechanism embodying rotary label feeding elements between which the label passes, adhesive applying mechanism, means for stripping the label from one of the feeding elements whereby the label will be fed across the path of advancing movement of the article, and means for pressing the label about the surface of the article, the first said means coöperating with one of the said rotary elements to positively advance the entire label when the latter is stripped from the other of the said rotary elements.

22. A labeling machine embodying article feeding mechanism, label supplying mechanism embodying rotary label feeding elements between which the label passes, adhesive applying mechanism, means for stripping the label from one of the feeding elements whereby the label will be fed across the path of advancing movement of the article, and means for pressing the label about the surface of the article, the said stripping means forming a support and guide for the label and coöperating with one of the rotary elements to advance the label when the latter is stripped from the other of the rotary elements.

23. A labeling machine embodying article feeding mechanism, labeling mechanism embodying rotary label feeding elements between which the label passes, a combined support and guide for the label, coöperating with one of the rotary elements to advance the label when the latter is stripped from the other rotary element, and a deflector operating to deflect the forward edge of the label in a direction across the path of movement of the article.

24. A labeling machine embodying article feeding mechanism, labeling mechanism embodying rotary label feeding elements between which the label passes, a combined support and guide for the label, and coöperating with one of the rotary elements to advance the label when the latter is stripped from the other rotary element, a portion of said guide and support projecting between the said feeding elements, and a deflector operating to deflect the forward edge of the label in a direction across the path of movement of the article.

25. A labeling machine embodying article feeding mechanism, labeling mechanism embodying rotary label feeding elements between which the label passes, a combined support and guide for the label, and coöperating with one of the rotary elements to advance the label when the latter is stripped from the other rotary element, and a deflector operating to deflect the forward edge of the label in a direction across the path of movement of the article, one of the rotary elements having paste applying ribs.

26. A labeling machine embodying article feeding mechanism, labeling mechanism embodying rotary label feeding elements between which the label passes, a combined support and guide for the label, and coöperating with one of the rotary elements to advance the label when the latter is stripped from the other rotary element, a deflector operating to deflect the forward edge of the label in a direction across the path of movement of the article, one of the rotary elements having paste applying ribs to contact with the label, and provisions for applying paste to the ribs before they contact with the label.

27. A labeling machine embodying article feeding mechanism, labeling mechanism embodying rotary label feeding elements between which the label passes, one of the elements having peripheral paste applying ribs, and the other element having friction portions adapted to engage the label, and a label support and guide for stripping the label from one of the said elements, the support and guide coöperating with the said other element to advance the label to the article.

28. A labeling machine embodying article feeding and holding mechanism, labeling mechanism embodying rotary label feeding elements between which the label passes, one of the elements having peripheral paste applying ribs, and the other element having friction portions adapted to engage the label, a label support and guide for stripping the label from one of the said elements, the support and guide coöperating with the said other element to advance the label to the article, and means controlled by the article in the holder for controlling the operation of the said elements.

29. A labeling machine embodying article feeding mechanism, labeling mechanism embodying rotary label feeding elements between which the label passes, said labeling mechanism also embodying means for advancing the label in the general direction of the advancing movement of the article with, and out of contact with the article, and means for deflecting a portion of the label across the path of movement and in advance of the article to be brought into engagement therewith, said feeding mechanism also operating to position a portion of the next succeeding label to be engaged by an article as the foremost label is delivered from said mechanism.

30. A labeling machine embodying article feeding mechanism, labeling mechanism embodying rotary label feeding elements, between which the label passes, said labeling mechanism also embodying means for positively advancing the entire label in the same general direction of the advancing movement of the article with, and out of contact with the article, means for deflecting a portion of the label across the path of movement and in advance of the article to be brought into engagement therewith, and provisions whereby one of the said rotary elements will apply an adhesive substance to one face of the label.

31. A labeling machine embodying article feeding mechanism, labeling mechanism embodying rotary label feeding elements between which the label passes, said labeling mechanism also embodying means for advancing the label in the general direction of the advancing movement of the article with, and out of contact with the article, means for deflecting a portion of the label across the path of movement and in advance of the article to be brought into engagement therewith, and means for causing an intermittent operation of said rotary elements, said rotary elements operating to deliver the edge of one label to an article and at the same time position the forward edge of another label across the path of advancement of the next succeeding article.

32. A labeling machine embodying article feeding mechanism, labeling mechanism embodying rotary label feeding elements between which the label passes, said labeling mechanism also embodying means for advancing the label in the general direction of the advancing movement of the article with, and out of contact with the article, means for deflecting a portion of the label across the path of movement and in advance of the article to be brought into engagement therewith, and means whereby the operation of the said rotary elements will be controlled by the article.

33. A labeling machine embodying article feeding mechanism, labeling mechanism embodying a rotary label feeding element, having spaced ribs for applying an adhesive substance to the label, provisions for supplying the ribs with an adhesive substance, means projecting into the space between the ribs for removing the label from the said element, and means coöperating directly with an extended surface of the first recited means for positively advancing the entire label to the article when the label is removed from the first recited element.

34. A labeling machine embodying article feeding mechanism, labeling mechanism embodying a rotary label feeding element, having spaced ribs for applying an adhesive substance to the label, provisions for supplying the ribs with an adhesive substance, means projecting into the space between the ribs for removing the label from the said element, means coöperating with the first recited means for advancing the label to the article when the label is removed from the first recited element, and provisions whereby the article will control the label feeding mechanism.

35. A labeling machine embodying article feeding mechanism, labeling mechanism embodying a rotary label feeding element, having spaced ribs for applying an adhesive substance to the label, provisions for supplying the ribs with an adhesive substance, means projecting into the space between the ribs for removing the label from the said element, means coöperating with the first recited means for advancing the label to the article when the label is removed from the first recited element, and means responsive to the movement of the article for controlling the operation of the label feeding mechanism.

36. A labeling machine embodying article feeding mechanism, label supplying mechanism, provisions for feeding the labels from the supply to the articles in the same general direction as, and during the advancing movement of the article and out of contact therewith, and means for deflecting a portion of the label across the path of the article to be contacted therewith, said feeding mechanism operating to positively deliver one label therefrom to one article to overcome drawing of the label from said mechanism by the article and simultaneously position the forward edge of the next succeeding label to contact with the next article.

37. A labeling machine embodying article feeding mechanism, label supplying mechanism, provisions for feeding a label from the supply to the article in the same general direction as, and during the advancing movement of the article and out of contact therewith, means for deflecting the label into the path of the article to be contacted therewith, and means for applying the label about the article, said feeding mechanism positively feeding one label therefrom to overcome drawing of the label from said mechanism by the article, and simultaneously positioning the forward edge of the next label to contact the next article.

38. A labeling machine embodying article feeding mechanism, label supplying mechanism, provisions for feeding a label from the supply to the article in the same general direction as, and during the advancing movement of the article and out of contact therewith, means for deflecting the label into the path of the article to be contacted therewith, and means for applying the label about the article and during the advancing movement of the article, said mechanism operating to positively deliver the remaining portion of the label to the article while the latter is advancing to overcome drawing of the label from said mechanism by the article, and also to position the forward edge of the next label to contact the next article.

39. A labeling machine embodying article feeding mechanism, label supplying mechanism, provisions for feeding a label from the supply to the article in the same general direction as, and during the advancing movement of the article and out of contact therewith, means for deflecting the label into the path of the article to be contacted therewith, and provisions controlled by the article for controlling the feeding of the label to the article, said mechanism operating to simultaneously and positively discharge one label and position the forward edge of the next label to contact the next article, to overcome drawing of the label from the feeding mechanism by the article.

40. A labeling machine embodying article feeding mechanism, label supplying mechanism, provisions for feeding a label from the supply to the article in the same general direction as, and during the advancing movement of the article and out of contact therewith, means for deflecting the label into the path of the article to be contacted therewith, and means arranged within the path of movement of the advancing article to be engaged and shifted by the article for controlling the feeding of the label to the article.

41. A labeling machine embodying article feeding mechanism, labeling mechanism embodying rotary label feeding elements, provisions whereby one of the elements will apply an adhesive substance to one face of the label, means disposed between the elements for stripping the label from one of the elements and coöperating with the other element for advancing the label and means for deflecting the label across the path of the advancing movement of the article.

42. A labeling machine embodying article feeding mechanism, labeling mechanism embodying rotary label feeding elements, provisions whereby one of the elements will apply an adhesive substance to one face of the label, means disposed between the elements for stripping the label from one of the elements and coöperating with the other element for advancing the label, and means for deflecting the label across the path of the advancing movement of the article, the first recited means operating to cause the label to be advanced simultaneously with the article in the same general direction thereof and out of contact therewith.

43. A labeling machine embodying article feeding mechanism, labeling mechanism embodying rotary label feeding elements, provisions whereby one of the elements will apply an adhesive substance to one face of the label, means disposed between the elements for stripping the label from one of the elements and coöperating with the other element for advancing the label, means for deflecting the label across the path of the advancing movement of the article, and yielding means for pressing the label and article into contact.

44. A labeling machine embodying article feeding mechanism, labeling mechanism embodying a rotary combined paste applying and advancing element for the label, said element having spaced peripheral ribs engaging the label, spaced fingers projecting into the spaces between the ribs for removing the label from the element and for supporting and guiding the label, and means coöperating with the fingers for advancing the label and presenting it to the article, 45. A labeling machine embodying article feeding mechanism, labeling mechanism embodying a rotary combined paste applying and advancing element for the label, said element having spaced peripheral ribs engaging the label, spaced fingers projecting into the spaces between the ribs for removing the label from the element and for supporting and guiding the label, and means coöperating with the fingers for advancing the label, and presenting it to the article, said ribs being provided with one or more recesses extending thereacross to form label non-paste applying portions.

46. A labeling machine embodying article feeding mechanism, labeling mechanism embodying a rotary combined paste applying and advancing element for the label, said element having spaced peripheral ribs engaging the label, spaced fingers projecting into the spaces between the ribs for removing the label from the element and for supporting and guiding the label, means coöperating with the fingers for advancing the label, and a deflectible element supported adjacent the ends of the fingers for directing the label from the fingers and across the path of the advancing article.

47. A labeling machine embodying article feeding mechanism, labeling mechanism embodying a rotary combined paste applying and advancing element for the label, said element having spaced peripheral ribs engaging the label, spaced fingers projecting into the spaces between the ribs for removing the label from the element and for supporting and guiding the label, means coöperating with the fingers for advancing the label, and provisions whereby the operation of the said rotary element will be automatically controlled by the article.

48. A labeling machine embodying article feeding mechanism, mechanism for feeding a label to the article, and means for causing an intermittent operation of the article feeding mechanism, the said means embodying a Geneva movement having a driving and a driven element, the said driving element being provided with spaced projections adapted to successively operate upon and move the driven element to cause two steps of the latter upon each complete revolution of the said driving element.

49. A labeling machine embodying article feeding mechanism, mechanism for feeding a label to the article, and means for causing an intermittent operation of the article feeding mechanism, the said means embodying a Geneva movement having a driving and a driven element, and provisions whereby the operation of the driving element will impart two steps of movement to the driven element upon each complete rotation of the driving element.

50. A labeling machine embodying article feeding mechanism, a Geneva movement for actuating said mechanism, mechanism for feeding a label to the article, and a Geneva movement for actuating the latter, both of the said Geneva movements embodying a driving and a driven element, and provisions whereby each of the driving elements will impart two steps of rotation to their driven elements upon each complete rotation of the respective driving elements.

51. A labeling machine embodying article feeding mechanism, a Geneva movement for actuating said mechanism, mechanism for feeding a label to the article, and a Geneva movement for actuating the latter, both of the said Geneva movements embodying a driving and a driven element, each of said driving elements being provided with two spaced projections operating upon the respective driven elements for imparting thereto two steps of movement upon the complete rotation of the respective driving elements.

52. A labeling machine embodying a hopper for holding a supply of labels, a rotary feeding element for removing and feeding the labels from the hopper, means for adjusting the hopper to vary the angular position of the hopper with relation to and in a direction lengthwise of the axis of the said element, and means for smoothing the label about the article in any position in which it may be fed to the article.

53. A labeling machine embodying a hopper for holding a supply of labels, feeding means for receiving the label from the hopper and feeding it to the article, means whereby the position of the hopper may be varied to vary the angular position lengthwise of the axis of the article in which the label is applied to the article, and provisions for pressing and smoothing the label about the article in any position in which it may be supplied to the article.

54. A labeling machine embodying a plurality of hoppers for holding supplies of labels, feeding mechanism for receiving and feeding the labels from the hoppers to the articles, provisions whereby the angles at which the labels are supplied to the article may be varied at will, and provisions for pressing and smoothing the labels about the article and in any position in which the labels are supplied thereto.

55. A labeling machine embodying label feeding mechanism, an article carrier embodying an article holder rotatable with respect thereto, means for bringing the article and label into contact, means for rotating the article with respect to the carrier during a portion of the movement of the latter and after the article and label are brought into contact, and a yielding presser element for pressing the edge of the label against the surface of the article, said presser element operating during a non-rotating period of the article with respect to its holder.

56. A labeling machine embodying label feeding mechanism, an article carrier, embodying an article holder rotatable with respect thereto, means for bringing the article and label into contact, means for rotating the article with respect to the carrier during a portion of the movement of the latter and after the article and label are brought into contact, a yielding presser element for pressing the edge of the label against the surface of the article, said presser element operating upon the article during a non-rotating period of the article with respect to the holder and a yielding element contacting with the label during the rotation of the article with respect to the carrier.

57. In a labeling machine, article clamping and holding means embodying opposed elements between which the ends of the article are clamped, one of said elements, being mounted for sliding movement toward and away from the other element, means tending normally to move the sliding element in a direction away from the other element, means operating automatically to move the sliding element in a clamping direction and against the stress of the first said means, and a locking device operating independently of the last recited means for locking the sliding element against such sliding movement.

58. In a labeling machine, article clamping and holding means embodying opposed elements between which the ends of the article are clamped, one of said elements being mounted for sliding movement toward and away from the other element, means tending normally to move the sliding element in a direction away from the other element, means operating automatically to move the sliding element in a clamping direction and against the stress of the first recited means, means separate from the last two recited means for locking the last recited element in a clamping position, and additional means for automatically rendering the said locking means inactive.

59. In a labeling machine, article clamping and holding means embodying opposed elements between which the ends of the article are clamped, one of said elements being mounted for sliding movement toward and away from the other element, and means tending normally to move the sliding element, in a direction away from the other element, positive means operating automatically to move the sliding element in a clamping direction against the stress of the first said means, and means individual to each of the sliding elements and independent of the other said means for locking the last recited element in a clamping position, said sliding element embodying a rotatable article engaging portion connected therewith.

60. In a labeling machine, article clamping and holding means embodying opposed elements between which the ends of the article are clamped, one of said elements being mounted for sliding movement toward and away from the other element, and means tending normally to move the sliding element in a direction away from the other element, positive means operating automatically to move the sliding element in a clamping direction against the stress of the first said means, means individual to each of the sliding elements and independent of the other said means for locking the last recited element in a clamping position, said sliding element embodying a rotatable article engaging portion connected therewith, and means for rotating the article about its axis and while it is held by the clamping means.

61. In a labeling machine, article clamping and holding means embodying opposed elements between which the ends of the article are clamped, one of said elements being mounted for sliding movement toward and away from the other element, means tending normally to move the sliding element in a direction away from the other element, positive means operating automatically to move the sliding element in a clamping direction and against the stress of the first said means, means individual to each of said sliding elements and independent of the other said means for locking the last recited element in clamping position, said sliding element embodying a rotatable article engaging portion connected therewith, and provisions for rotating the other clamping element to rotate the article about its axis and while it is held by the clamping means.

62. In a labeling machine, article holding and clamping means embodying opposed elements between which the article is clamped, one of said elements being movable into and out of clamping position with respect to the other element, means tending normally to cause said movable element to assume an unclamping position, positive means operating automatically to cause the movable element to assume a clamping position and against the stress of the last recited means and means individual to each of the said movable elements and independent of the other said means and operating automatically to maintain the movable element in a clamping position.

63. In a labeling machine, article holding and clamping means embodying opposed elements between which the article is clamped, one of said elements being movable into and out of clamping position with respect to the other element, means tending normally to cause said movable element to assume an unclamping position, positive means operating automatically to cause the movable element to assume a clamping position and against the stress of the last recited means, means individual to each of the said movable elements and independent of the other said means and operating automatically to maintain the movable element in a clamping position, and provisions operating automatically to render the last recited means inactive.

64. In a labeling machine, article holding and clamping means embodying opposed elements between which the article is clamped, one of said elements being movable into and out of clamping position with respect to the other element, means tending normally to cause the said movable element to assume an unclamping position, positive means operating automatically to cause the movable element to assume a clamping position and against the stress of the last recited means, and means individual to the said movable elements and independent of the other said means and operating automatically to maintain the movable element in a clamping position, said clamping elements supporting the article for rotation about its axis.

65. In a labeling machine, article clamping means embodying a clamp having cooperating portions, one of which portions is adapted for movement into and out of clamping relation with respect to the other, positive means operating automatically to render the clamp active, provisions for advancing the article while held by the clamp, provisions for rotating the article about its axis and while held by the clamp, and positive means independent of the second recited means for rendering the clamp inactive to release the article.

66. In a labeling machine, article clamping means embodying a clamp having cooperating portions, one of which portions is adapted for movement into and out of clamping relation with respect to the other, positive means operating automatically to render the clamp active, locking means individual to the clamping means, provisions for advancing the article while held by the clamp, provisions responsive to the advancement of the article for rotating the article about its axis and while held by the clamp, and independent means for rendering the said locking means inactive to release the article.

67. In a labeling machine, article clamping means embodying a clamp having cooperating portions, one of which portions is adapted for movement into and out of clamping relation with respect to the other, positive means operating automatically to render the clamp active, locking means individual to the clamps, provisions for advancing the article while held by the clamp, means operatively related to one of the clamp portions for rotating the article about its axis and while held by the clamp, and independent means rendering the said locking means inactive to release the article.

68. In a labeling machine, article clamping means embodying a clamp having cooperating portions, one of which portions is adapted for movement into and out of clamping relation with respect to the other, positive means for automatically rendering the clamp active, locking means individual to the clamps, provisions for advancing the article while held by the clamp, provisions embodying a gear and rack for rotating the article about its axis and while held by the clamp, and independent means for rendering the locking means inactive to release the article.

69. In a labeling machine, article clamping means embodying a clamp having cooperating portions, one of which portions is adapted for movement into and out of clamping relation with respect to the other, positive means operating automatically to render the clamp active, locking means individual to the clamps, provisions for advancing the article while held by the clamp, provisions embodying a gear and rack for rotating the article about its axis and while held by the clamp, independent means for rendering the said locking means inactive to release the article, and provisions for holding the article against rotation about its axis during a portion of its advancing movement and while held by the clamp.

70. In a labeling machine, article clamping means embodying a clamp having cooperating portions, one of which portions is adapted for movement into and out of clamping relation with respect to the other, provisions for automatically rendering the clamp active, locking means individual to the clamps, provisions for advancing the article while held by the clamp, provisions for rotating the article about its axis while held in the clamp and during the advancement of the article, the last recited provisions embodying a gear operatively related to one of the clamp portions and a rack arranged in the path of the advancing movement of the gear, positively operating means for rendering the clamp active, and independent means for rendering the said locking means inactive.

71. In a labeling machine, article clamping means embodying a clamp having coöperating portions, one of which portions is adapted for movement into and out of clamping relation with respect to the other, provisions for automatically rendering the clamp active, provisions for advancing the article while held by the clamp, provisions for rotating the article about its axis while held in the clamp and during the advancement of the article, the last recited provisions embodying a gear operatively related to one of the clamp portions and a rack arranged in the path of the advancing movement of the gear, positively operating means for automatically rendering the clamp active, locking means individual to the clamps and independent means responsive to the advancement of the article for automatically rendering the locking means inactive.

72. An article clamp embodying coöperating clamp portions, means for supporting said portions for advancement, one of said portions being mounted for rotation with respect to its supporting means, the other portion being mounted for movement into and out of clamping relation with respect to the other portion and having an article engaging portion rotatably connected therewith positively operating means for automatically rendering the clamp portions active, locking means individual to the clamps, means for rotating the article about its axis and through the medium of one of the clamp portions, and means independent of the other said means for automatically rendering the said locking means inactive.

73. An article clamp embodying clamp portions, means for supporting said portions for advancement, one of said portions being mounted for rotation with respect to its supporting means, the other portion being mounted for movement into and out of clamping relation with respect to the other portion and having an article engaging portion rotatably connected therewith positively operating means for automatically rendering the clamp portions active, locking means individual to the clamps, means for rotating the article about its axis and through the medium of one of the clamp portions, and embodying a gear connected with one of the clamp portions and a rack with which the gear coöperates, and means independent of the other said means, for automatically rendering the said locking means inactive.

74. An article clamp embodying clamp portions, means for supporting said portions for advancement, one of said portions being mounted for rotation with respect to its supporting means, the other portion being mounted for movement into and out of clamping relation with respect to the other portion and having an article engaging portion rotatably connected therewith, positively operating means for automatically rendering the clamp portions active, means for rotating the article about its axis and through the medium of one of the clamp portions, and embodying a gear connected with one of the clamp portions and a rack with which the gear coöperates, means common to the clamps and coöperating with the last recited clamp portions for holding the latter against rotation, and means independent of the other said means for automatically releasing the article from the clamp.

75. An article clamp embodying a plurality of clamps, each embodying two coöperating clamp portions, one of which is movable into and out of clamping relation with the other, means for moving the said movable clamp portion into an inactive position, means common to the said movable clamp portion for moving them into clamping position, the last said means embodying a pivotally mounted shifting device adapted to successively contact with and move the said movable clamp portions, a cam device for actuating the said shifting device, and means for maintaining the movable clamp portion in a clamping position.

76. An article clamp embodying a plurality of clamps, each embodying two coöperating clamp portions, one of which is movable into and out of clamping relation with the other, means for moving the said movable clamp portion into an inactive position, means common to said movable portions for moving them into clamping position, the last said means embodying a pivotally mounted shifting device adapted to successively contact with and move the said movable clamp portions, a cam device for actuating the said shifting device, a retaining device for maintaining the movable clamp device in a clamping position, and means for automatically rendering the retaining device inactive.

77. An article clamping device embodying coöperating clamping portions relatively movable into and out of clamping relation, means for rendering the clamp active, provisions whereby the article may be rotated about its axis while held by the clamp, means for rendering the clamp inactive to release the article, and means movable with one of the clamp portions for causing the article to be moved out of engaging relation therewith when the article is released by the other clamp portion.

78. An article clamping device embodying coöperating clamping portions relatively movable into and out of clamping relation, means for rendering the clamp active, provisions whereby the article may be rotated about its axis while held by the clamp, means for rendering the clamp inactive to release the article, and means carried by and coöperating with one of the clamp portions for causing the article to be moved out of engaging relation therewith when the article is released by the other clamp portion, the last recited means embodying an automatically operating ejector.

79. An article clamping device embodying coöperating clamping portions relatively movable into and out of clamping relation, means for rendering the clamp active, provisions whereby the article may be rotated about its axis while held by the clamp, means for rendering the clamp inactive to release the article, means coöperating with one of the clamp portions for causing the article to be moved out of engaging relation therewith when the article is released by the other clamp portion, and means for compensating the varying sizes of the articles.

80. An article clamping device embodying coöperating clamping portions relatively movable into and out of clamping relation, means for rendering the clamp active, provisions whereby the article may be rotated about its axis while held by the clamp, means for rendering the clamp inactive to release the article, means coöperating with one of the clamp portions for causing the article to be moved out of engaging relation therewith when the article is released by the other clamp portion, and means coöperating with each of the said clamp portions for compensating the varying sizes of the articles.

81. An article clamping device embodying coöperating clamping portions relatively movable into and out of clamping relation, means for rendering the clamp active, additional means operating automatically to compensate the varying sizes of the articles, and labeling mechanism for the article.

82. An article clamping device embodying coöperating clamping portions relatively movable into and out of clamping relation, means for rendering the clamp active, means for rendering the clamp inactive, additional means operatively related to each of the said clamping portions and operating automatically to compensate the varying sizes of the articles, and labeling mechanism for the articles.

83. A labeling machine embodying labeling mechanism, article carrying means for presenting the article to the labeling mechanism and for carrying it away therefrom, provisions for rotating the article with respect to the carrier and during the label applying operation, and a conveyer for receiving the labeled article, the labeled article being delivered to the said conveyer in a substantially horizontal position and in such a manner that the labeled portion will be held out of contact with the conveyer.

84. A labeling machine embodying labeling mechanism, an article carrier, provisions for rotating the article about its axis and while the label is being applied thereto, a receiving conveyer for receiving the labeled article in a substantially horizontal position, and provisions for arresting the rotation of the article whereby the unlabeled portion thereof will be deposited against the said conveyer.

85. In a labeling machine in which the article is rotated about its axis during the label applying operation, a surface with which the rotating article and the entire surface of the label contact, and means for heating such surface.

86. A labeling machine embodying label feeding mechanism, an article carrier, and provisions for causing the article and label to be brought into contact, said labeling means embodying provisions for projecting portions of the label into the path of the advancing movement of an article and operating independently of the article for positively feeding the remaining portion of the label to the article in the same general direction as the advancement of the article to overcome drawing of the label from the feeding mechanism by the article and also operating to positively position a portion of the next succeeding label into the path of the next advancing article and during the advancement of the first recited article and after the first said portion of the first said label has been brought into contact with its article.

87. A labeling machine embodying intermittently operating label feeding mechanism, an article carrier, and provisions for intermittently advancing the article to the label, the said label feeding mechanism operating to feed a portion of one label into the path of movement of the advancing article, during one operation of the label feeding mechanism, another operation of the label feeding mechanism during the advancement of the article, operating to feed the remaining portion of that label to that article, and feed another portion of the next succeeding label into the path of the advancing movement of the next succeeding article to be engaged thereby.

88. A labeling machine embodying article feeding mechanism, labeling mechanism embodying rotary label feeding elements between which the label passes, one of the elements having peripheral paste applying ribs, and the other elements having friction portions adapted to engage the label, a label support and guide for stripping the label from one of the said elements, the support and guide coöperating with the said other element to advance the label to the article, and a reciprocating label supply holder for presenting the labels to the said ribs.

89. A labeling machine embodying article feeding mechanism, labeling mechanism embodying label feeding elements, provisions for applying an adhesive substance to one face of the label, means disposed between the elements for stripping the label from one of the elements and coöperating with the other element for advancing the label, means for deflecting the label across the path of the advancing movement of the article, and yielding means for pressing the label and article into contact, the last said means embodying a roller engaging the label and movable over the surface of the article.

90. An article clamping device embodying coöperating clamping portions relatively movable into and out of clamping relation, means for rendering the clamp active, means for rendering the clamp inactive to release the article, means coöperating with one of the clamp portions for causing the article to be moved out of engaging relation therewith when the article is released by the other clamp portion, means for compensating the varying sizes of the articles, and labeling mechanism for the article.

91. A labeling machine embodying label feeding mechanism, an article holder, and provisions for bringing the label and article into contact, the said label feeding mechanism operating to feed a portion of one label into a position to contact with an article, during one portion of the operation of the label feeding mechanism, another portion of the operation of the label feeding mechanism during the application of one label to an article, operating to feed the remaining portion of that label to that article and in the same general direction as the advancing movement of the article to overcome drawing of the article from said mechanism by the article, and feed another portion of the next succeeding label into a position to contact with the next succeeding article.

92. A labeling machine embodying label feeding mechanism, an article holder, and provisions for bringing the label and article into contact, the said label feeding mechanism operating to feed a portion of one label into a position to contact with an article, during one portion of the operation of the label feeding mechanism, another portion of the operation of the label feeding mechanism during the application of one label to an article, operating to feed the remaining portion of that label to that article in the same general direction as the advancement of the article to overcome drawing of the article from said mechanism by the article, and feed another portion of the next succeeding label into a position to contact with the next succeeding article, and yielding means embodying a roller for contacting and smoothing the label over the surface of the article.

93. A labeling machine embodying label feeding mechanism, an article holder, and provisions for bringing the label and article into contact, the said label feeding mechanism operating to feed a portion of one label into a position to contact with an article, during one portion of the operation of the label feeding mechanism, another portion of the operation of the label feeding mechanism during the application of one label to an article, operating to feed the remaining portion of that label to the article in the same general direction as the advancement of the article, to overcome drawing of the label from said mechanism by the article, and feed another portion of the next succeeding label into a position to contact with the next succeeding article, and provisions for smoothing the label over the surface of the article.

94. A labeling machine embodying label feeding mechanism, an article holder, and provisions for bringing the label and article into contact, the said label feeding mechanism operating to feed a portion of one label into a position to contact with an article, during one portion of the operation of the label feeding mechanism, another portion of the operation of the label feeding mechanism during the application of one label to an article, operating to feed the remaining portion of that label to the article in the same general direction as the advancement of the article to overcome drawing of the label from said mechanism by the article, and feed another portion of the next succeeding label into a position to contact with the next succeeding article, and provisions embodying a roller adapted to contact with and smooth the label over the surface of the article.

95. A labeling machine embodying an article carrier, positive means operating automatically to engage the extremities of the ends of the article to clamp the article in the carrier, provisions for intermittently advancing the carrier, label affixing mechanism embodying a reciprocatory label supply holder and means for receiving and positively feeding the label to the article, and provisions for automatically unclamping the article for discharging the article from the carrier.

In testimony whereof I have signed my name to this specification, in the presence of two subscribing witnesses, on this 8th day of January A. D. 1914.

GEORGE WEISS.

Witnesses:
I. M. BARING,
J. H. JOCHUM, Jr.

Copies of this patent may be obtained for five cents each, by addressing the "Commissioner of Patents Washington, D. C."